US012306574B2

(12) United States Patent
Fujita et al.

(10) Patent No.: US 12,306,574 B2
(45) Date of Patent: May 20, 2025

(54) AIR VENTILATION STRUCTURE IN IMAGE FORMING APPARATUS

(71) Applicant: CANON KABUSHIKI KAISHA, Tokyo (JP)

(72) Inventors: Takashi Fujita, Chiba (JP); Tomoki Hasegawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/488,141

(22) Filed: Oct. 17, 2023

(65) Prior Publication Data

US 2024/0134311 A1 Apr. 25, 2024
US 2024/0231272 A9 Jul. 11, 2024

(30) Foreign Application Priority Data

Oct. 25, 2022 (JP) ................................ 2022-170873

(51) Int. Cl.
*G03G 21/20* (2006.01)
*G03G 15/02* (2006.01)

(52) U.S. Cl.
CPC ....... *G03G 21/206* (2013.01); *G03G 15/0258* (2013.01)

(58) Field of Classification Search
CPC ......................... G03G 21/206; G03G 15/0258
See application file for complete search history.

(56) References Cited

U.S. PATENT DOCUMENTS 5,004,223 A * 4/1991 Okui ...................... G03G 15/60 271/7
2004/0197108 A1* 10/2004 Yamagata .......... H04N 1/32609 399/92
2011/0026964 A1* 2/2011 Yasumoto ............ G03G 21/206 399/94
2021/0286318 A1* 9/2021 Okamoto ........... H04N 1/00084
2022/0404763 A1* 12/2022 Tashiro .............. G03G 15/0258
2023/0036856 A1* 2/2023 Koyama ............ G03G 15/2039
2023/0305483 A1* 9/2023 Takayama ............ G03G 21/206
2023/0305484 A1* 9/2023 Terakawa ........... G03G 21/1633

FOREIGN PATENT DOCUMENTS

JP H10149081 A 6/1998

* cited by examiner

*Primary Examiner* — Carla J Therrien

(74) *Attorney, Agent, or Firm* — ROSSI, KIMMS & McDOWELL LLP

(57) ABSTRACT

An image forming apparatus comprises a housing and an image forming unit. The housing includes a protective member with a protective state in which the protective member is protecting a protection target and a non-protective state in which the protective member is not protecting the protection target, an intake port, a duct for guiding air taken in from the intake port to the image forming unit and guide the air from the image forming unit to outside of the housing, an exhaust port connected to the duct and for discharging the air to outside of the housing, a fan provided in a section from the intake port to the exhaust port in the duct and for assisting intake, discharging or both of intake and discharging of the air, and a processor for controlling the one fan.

19 Claims, 17 Drawing Sheets

AIR VENTILATION STRUCTURE IN IMAGE FORMING APPARATUS

BACKGROUND OF THE INVENTION

Field of the Invention

The present invention relates to an air ventilation structure in an image forming apparatus.

Description of the Related Art

An electrophotographic image forming apparatus includes a charger, which charges a photosensitive body, and a developing device, which develops an electrostatic latent image. Since the charger generates ozone, which oxidizes frames and the like, the ozone needs to be discharged. Since the developing device has an appropriate operating temperature assumed by design, the developing device needs to be cooled. Therefore, Japanese Patent Laid-Open No. H10-149081 proposes discharging air taken in from the outside of the image forming apparatus after circulating it in the image forming apparatus.

Incidentally, a sheet jam may occur in the image forming apparatus. The jammed sheet is removed by opening a maintenance door of the image forming apparatus. At this time, if unfixed toner present on the sheet is sucked into the image forming apparatus from an intake port, the charger will end up being soiled by the toner.

SUMMARY OF THE INVENTION

The present disclosure provide an image forming apparatus comprising: a housing; and an image forming unit provided in the housing and configured to form an image on a sheet, wherein the image forming unit includes: a photosensitive body; a charger configured to charge a surface of the photosensitive body; an exposure device configured to form an electrostatic latent image by exposing the surface of the photosensitive body; a developing device configured to form a toner image on the surface of the photosensitive body by developing the electrostatic latent image using toner; and a transfer roller configured to transfer the toner image from the photosensitive body to a sheet, and wherein the housing includes: a protective member configured to be switched between in a protective state in which the protective member is protecting a protection target and in a non-protective state in which the protective member is not protecting the protection target; an intake port configured to take in air; a duct configured to guide the air taken in from the intake port to the image forming unit and guide the air from the image forming unit to outside of the housing; an exhaust port connected to the duct and configured to discharge the air to outside of the housing; a fan provided in a section from the intake port to the exhaust port in the duct and configured to assist intake, discharging or both of intake and discharging of the air; and a processor configured to control the fan, wherein the processor is configured to, in a case where the protective member is in the protective state, permit rotation of the fan and, in a case where the protective member is in the non-protective state, restrict rotation of the fan.

Further features of the present invention will become apparent from the following description of exemplary embodiments (with reference to the attached drawings).

BRIEF DESCRIPTION OF THE DRAWINGS

FIG. 13 is a block diagram illustrating a CPU and the like.

DESCRIPTION OF THE EMBODIMENTS

Figure 1:
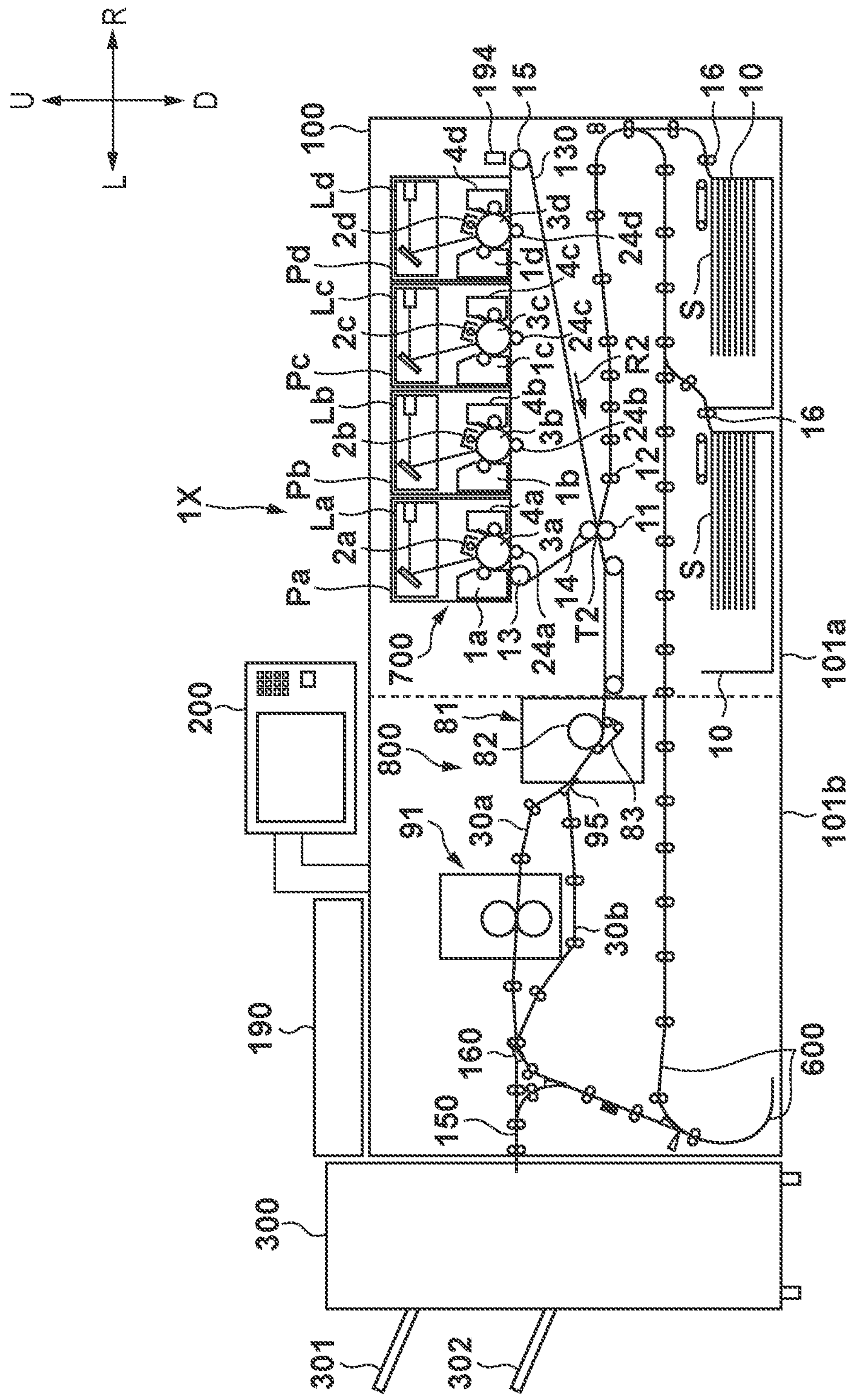
FIG. 1 is a diagram illustrating an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following, "U" of FIG. 1 and the like indicates upward. "D" indicates downward. "L" indicates leftward. "R" indicates rightward. "F" indicates forward. "B" indicates backward.

Image Forming System

An image forming system 1X illustrated in FIG. 1 includes an image forming apparatus 100 and a finisher apparatus 300. The image forming system 1X may be commercialized as, for example, a printer, a copier, a fax machine, or a multifunction peripheral. The image forming apparatus 100 and the finisher apparatus 300 are connected to each other such that a sheet S can be passed. The finisher apparatus 300 is a post-processing unit which can be retrofitted to the image forming apparatus 100 for function expansion. The finisher apparatus 300 applies post-processing on a sheet S on which toner images have been fixed by the image forming apparatus 100. The image forming apparatus 100 and the finisher apparatus 300 transmit and receive data and commands via a communication interface capable of serial communication or parallel communication.

Image Forming Apparatus

The image forming apparatus 100 is a tandem full color printer for forming an image on a sheet S using an electrophotographic method. The image forming apparatus 100 includes a first housing 101*a* and a second housing 101*b*. The first housing 101*a* includes various devices (e.g., an image forming unit 700) and various members for conveying a sheet S and transferring toner images onto the sheet S.

The second housing 101*b* includes various devices (e.g., a fixing unit 800) and various members for conveying a sheet S and fixing toner images onto the sheet S. An operation unit 200 is disposed on an upper portion of the second housing 101*b*. The operation unit 200 includes a display apparatus capable of displaying various kinds of information and an input apparatus capable of inputting various kinds of information according to a user operation. The operation unit 200 is disposed so as to be operable by an operator standing on a front side of the image forming apparatus 100.

An electrical unit (not illustrated), which includes a power supply board, may be disposed on an inner back side of the first housing 101*a* and the second housing 101*b*. In the present specification, a side on which the operator stands when operating the operation unit 200 in order for the user to operate the image forming apparatus 100 is defined as the "front". A side opposite to the front is defined as the "back". A side surface of the image forming system 1X on the left side when the operator is looking at the image forming system 1X from the front side is defined as the "left side surface". A side surface of the image forming system 1X on the right side when the operator is looking at the image forming system 1X from the front side is defined as the "right side surface".

The image forming unit 700 includes image forming units Pa, Pb, Pc, and Pd. The image forming unit Pa forms a yellow image. The image forming unit Pb forms a magenta image. The image forming unit Pc forms a cyan image. The image forming unit Pd forms a black image. The image forming apparatus 100 forms toner images on a sheet S according to an image signal received from a document reading apparatus 190 for reading a document and generating an image signal or an external device (not illustrated), such as a personal computer (PC).

The image forming unit 700 is formed by the image forming units Pa to Pd, primary transfer rollers 24*a* to 24*d*, an intermediate transfer belt 130, a plurality of rollers 13 to 15, and an outer roller 11. A sheet S may be any of, for example, a sheet of paper material, such as plain paper, cardboard, rough paper, embossed paper, and coated paper, a sheet of resin material, such as such as plastic film, and a sheet of cloth material.

The image forming units Pa to Pd are arranged side by side (tandem type) along a direction of movement of the intermediate transfer belt 130. The intermediate transfer belt 130 is stretched over the rollers 13, 14, and 15 and moves (rotates) in the direction of an arrow R2. The intermediate transfer belt 130 carries and conveys toner images to be transferred as will be described later. The outer roller 11 is disposed at a position facing the roller 14. The outer roller 11 and an inner roller (roller 14) form a secondary transfer unit T2 for transferring the toner images on the intermediate transfer belt 130 onto a sheet S. The fixing unit 800 is disposed downstream of the secondary transfer unit T2 in a direction of conveyance of the sheet S.

A plurality of cassettes 10 (e.g., two cassettes) for storing sheets S are disposed below the image forming unit 700. The plurality of cassettes 10 each contain a difference size or thickness of sheets S. A sheet S is conveyed from the cassette 10 selected by the operator. The sheet S is fed from the cassette 10 to the conveyance path by a conveyance roller 16. Further, the sheet S is conveyed to a registration roller 12 via the conveyance path. The registration roller 12 rotates in synchronization with the toner images formed on the intermediate transfer belt 130 and conveys the sheet S to the secondary transfer unit T2. The present invention is not limited to the sheet S stored in the cassette 10, and the sheet S may be fed from a manual feeding unit (not illustrated) and conveyed to the secondary transfer unit T2.

The image forming units Pa, Pb, Pc, and Pd have substantially the same configuration except that the developing colors of the toner images are different. Therefore, in order to make the description common to the image forming units Pa, Pb, Pc, and Pd, the letters a, b, c, and d at the end of reference numerals assigned to members constituting the image forming unit P will be omitted.

A cylindrical photosensitive drum 3 is disposed as a photosensitive body in the image forming unit P. The photosensitive drum 3 is driven to rotate by a motor (not illustrated). A charger 2, an exposure device L, a developing device 1, a primary transfer roller 24, and a drum cleaning device 4 are disposed near the photosensitive drum 3.

The charger 2 uniformly charges the surface of the rotating photosensitive drum 3. The charger 2 is, for example, a corona charger for irradiating the surface of the photosensitive drum 3 with charged particles that accompany corona discharge. The exposure device L exposes the surface of the photosensitive drum 3 while scanning a laser beam that corresponds to an image signal. An electrostatic latent image that accords with the image signal is thus formed on the surface of the photosensitive drum 3. The developing device 1 forms a toner image by developing the electrostatic latent image formed on the surface of the photosensitive drum 3 using toner. The developing device 1, for example, stores developer, which includes toner and carrier. The developing device 1 circulates and transfers the developer while stirring it using a screw (not illustrated).

The photosensitive drum 3 conveys the toner image to a primary transfer unit T1. The primary transfer unit T1 is formed by the photosensitive drum 3 and the primary transfer roller 24. The primary transfer unit T1 transfers (primary-transfers) the toner image from the photosensitive drum 3 to the intermediate transfer belt 130. A primary transfer voltage for facilitating primary transfer is applied to the primary transfer roller 24. The drum cleaning device 4 cleans the toner not transferred to the intermediate transfer belt 130 and remaining on the surface of the photosensitive drum 3.

Such a primary transfer operation is sequentially performed in the respective yellow, magenta, cyan, and black image forming units Pa to Pd. The toner images of four colors are thus overlaid on the intermediate transfer belt 130, thereby forming a full color image.

The sheet S is conveyed from the cassette 10 to the secondary transfer unit T2 according to a toner image formation timing. A full-color toner image formed on the intermediate transfer belt 130 is transferred to the sheet S (secondary transfer) by a secondary transfer voltage being applied to the outer roller 11. The toner remaining on the intermediate transfer belt 130 is removed by a belt cleaning device (not illustrated). The belt cleaning device includes, for example, a cleaning blade and a toner collection container that are disposed so as to face the roller 13.

The sheet S to which the toner image has been transferred is conveyed to the fixing unit 800. The fixing unit 800 fixes the toner image onto the sheet S by applying heat and pressure to the sheet S to which the toner image has been transferred. According to FIG. 1, the fixing unit 800 includes a first fixing device 81 and a second fixing device 91.

The first fixing device 81 includes a fixing roller 82 and a pressing belt 83. The fixing roller 82 and the pressing belt 83 form a fixing nip portion. The fixing roller 82 is a roller that can rotate while being in contact with the surface on which the toner image has been transferred between two surfaces of the sheet S. The pressing belt 83 rotates while pressing against the fixing roller 82. At least one of the fixing roller 82 and the pressing belt 83 is heated by a heater (not illustrated). When the sheet S passes through the fixing nip portion, heat and pressure are applied from the first fixing device 81, thereby fixing the toner image onto the sheet S.

The structure of the second fixing device 91 is the same as the structure of the first fixing device 81. The second fixing device 91 is disposed downstream of the first fixing device 81. The second fixing device 91 is selectively used, for example, for further applying gloss to the toner image on the sheet S. For example, when the sheet S is coated paper, such as glossy paper or synthetic paper, both the first fixing device 81 and the second fixing device 91 perform the fixing processing. In other words, upon passing through the first fixing device 81, the sheet S is guided to a fixing route 30*a* by a flapper 95 and fed to the second fixing device 91. Meanwhile, when the sheet S is non-coated paper such as plain paper, the first fixing device 81 performs the fixing processing, but the second fixing device 91 does not perform the fixing processing. Therefore, upon passing through the first fixing device 81, the sheet S is guided to a bypass route 30*b* for bypassing the second fixing device 91 by the flapper 95.

The image forming apparatus 100 can perform double-sided printing. In a case of one-sided printing, a flapper 160 guides the sheet S on which the toner image has been fixed to a conveyance path 150. The conveyance path 150 discharges the sheet S out of the image forming apparatus 100. In a case of double-sided printing, the flapper 160 guides the sheet S on which the toner image has been fixed to a conveyance path 600. The conveyance path 600 is formed across the first housing 101*a* and the second housing 101*b*. The conveyance path 600 reverses the front and back sides of the sheet S by a switchback operation. The conveyance path 600 conveys the sheet S to the registration roller 12. The registration roller 12 conveys the sheet S to the secondary transfer unit T2. The back side of the sheet S on which an image is not printed faces the intermediate transfer belt 130.

In the secondary transfer unit T2, a full-color toner image formed on the intermediate transfer belt 130 is transferred to the sheet S (back side). The toner image is then fixed onto the sheet S by the fixing unit 800, and the sheet S is discharged out of the image forming apparatus 100.

In FIG. 1, the fixing unit 800 includes the first fixing device 81 and the second fixing device 91; however, the fixing unit 800 may include only the first fixing device 81. The second housing 101*b* may include a cooling device for cooling the sheet S on which the toner image has been fixed by the fixing unit 800.

The finisher apparatus 300 is connected the image forming apparatus 100 such that the sheet S can be passed, and the sheet S discharged from the image forming apparatus 100 is conveyed to the finisher apparatus 300. The finisher apparatus 300 executes post-processing on the sheet S. The post-processing includes, for example, punching processing for punching holes in the sheet S and stapling processing for bundling and stapling a plurality of sheets S. The finisher apparatus 300 discharges the punched sheet S to a tray 301. The finisher apparatus 300 discharges the stapled bundle of sheets S to a tray 302.

A cover switch 194 is provided in FIG. 1. The cover switch 194 is a sensor for detecting a mounting state of protective members (e.g., a door and a cover), which will be described later.

Airflow

The image forming apparatus 100 cools the inside of the image forming apparatus 100 by taking in air from the outside and discharging the air. Such flow of air is called airflow. First, an airflow related the developing devices 1*a* to 1*d* will be described.

Figure 2A:
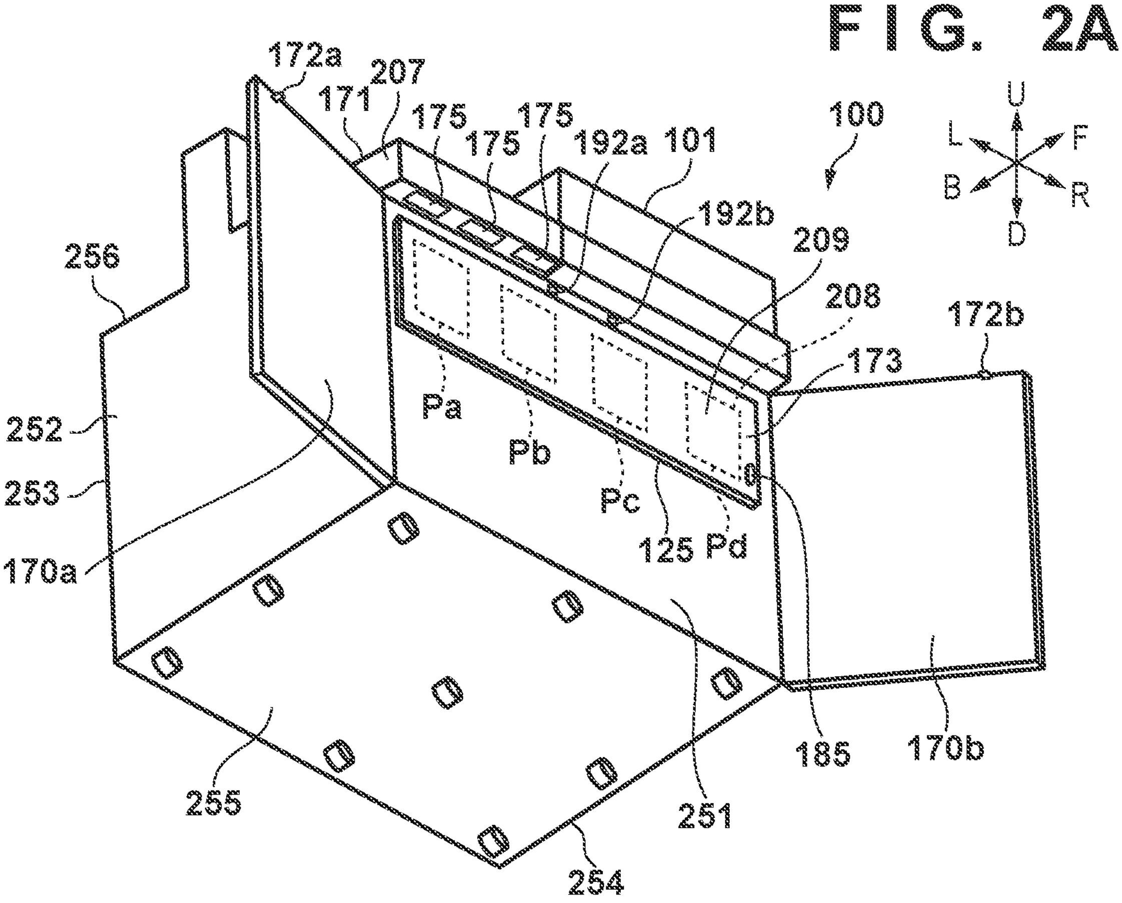
FIG. 2A is a diagram illustrating a state in which front doors are open.
Figure 2B:
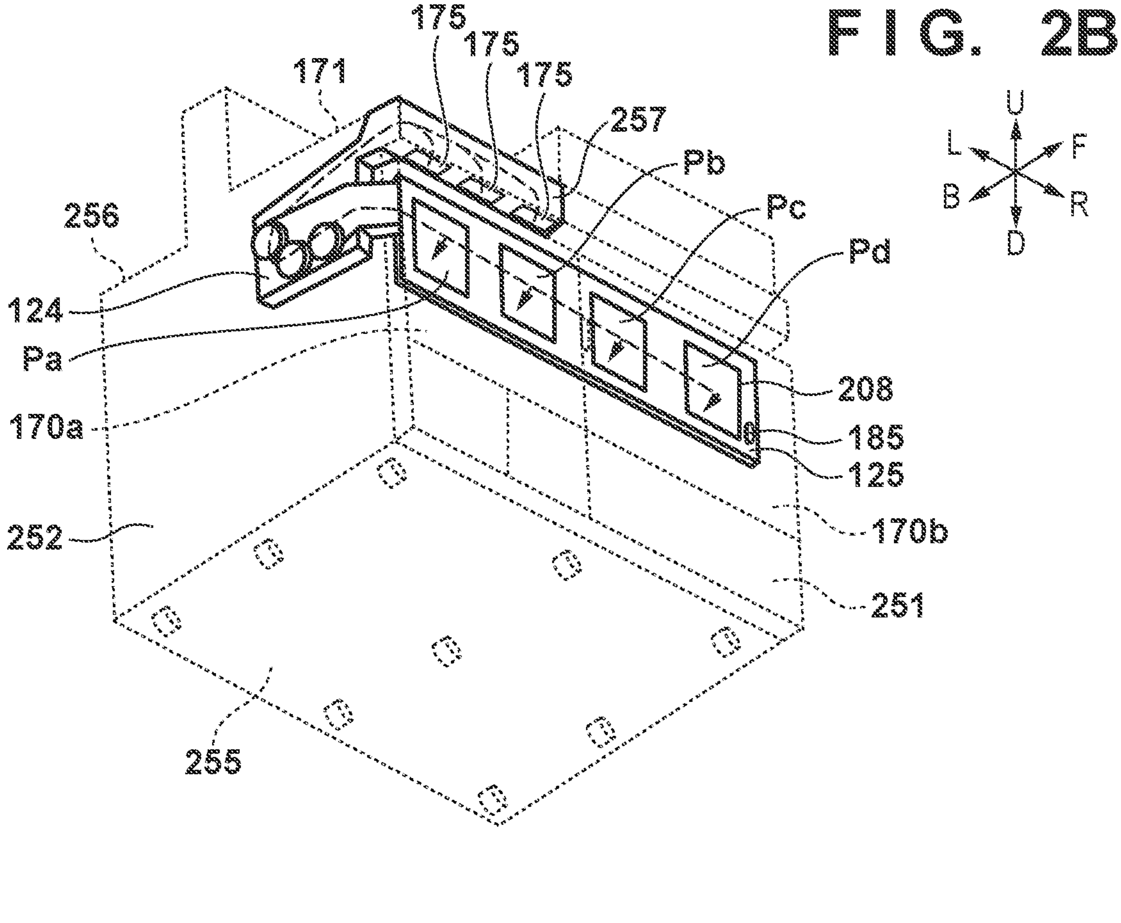
FIG. 2B is a diagram illustrating a state in which the front doors are closed.

FIG. 2A illustrates the image forming apparatus 100 in a state in which front doors are open. FIG. 2B illustrates the image forming apparatus 100 in a state in which the front doors are closed. The image forming apparatus 100 has a front surface 251, a left side surface 252, a back surface 253, a right side surface 254, a bottom surface 255, and a top surface 256.

A left front door 170*a* and a right front door 170*b* are provided on the front of the first housing 101*a* and are maintenance doors that function as an outer cover and can be opened and closed. In the present example, the left front door 170*a* and the right front door 170*b* are double doors. A hinge is provided at the left end of the left front door 170*a*. A hinge is also provided at the right end of the right front door 170*b*.

Door switches 192*a* and 192*b* are provided on the front surface 251 of the first housing 101*a*. The door switch 192*a* is disposed at a position at which it will be pressed by a protrusion 172*a* provided on the left front door 170*a*. That is, the door switch 192*a* can detect a state (protective state) in which the left front door 170*a* is closed and a state (non-protective state) in which the left front door 170*a* is not closed. The door switch 192*b* is disposed at a position at which it will be pressed by a protrusion 172*b* provided on the right front door 170*b*. That is, the door switch 192*b* can detect a state (protective state) in which the right front door 170*b* is closed and a state (non-protective state) in which the right front door 170*b* is not closed.

A top surface cover 171 is provided above the left front door 170*a*. A portion of the top surface cover 171 forms a protruding portion 257, which protrudes farther toward the front side of the image forming apparatus 100 than the left front door 170*a* in a closed state. Three intake ports 175 are formed on the lower surface of the protruding portion 257. For example, a filter for removing dust from the air that has been taken in may be attached to the openings of the three intake ports 175. There need only be one or more intake ports 175.

A cover 173 is provided on the front surface 251 of the first housing 101*a*. The cover 173 is covered by the left front door 170*a* and the right front door 170*b* when the left front door 170*a* and the right front door 170*b* are closed. The cover 173 can prevent the user from touching movable portions, electrical wires, and the like inside the first housing 101*a*. Meanwhile, a service person (person in charge of maintenance) needs to access and perform maintenance on the movable portions, electrical wires, and the like inside the first housing 101*a*. The cover 173 is provided on the first housing 101*a* so as to be capable of being attached and detached by a lock lever 185. The service person detaches the cover 173 by releasing the lock lever 185 and accesses the inside of the first housing 101*a*. The cover 173 has four openings 208 through which the image forming units Pa to Pd can be individually inserted and removed from the first housing 101*a*. The four openings 208 are each provided with a member 209, which covers a corresponding one of the image forming units Pa to Pd and is capable of being attached and detached.

The cover switch 194 illustrated in FIG. 1 and the lock lever 185 are provided at the same position in a left-right direction and a height direction. The cover switch 194 detects an attached/detached state (protective state/non-protective state) of the cover 173 by detecting the state (e.g., a locked state or a released state) of the lock lever 185.

As illustrated in FIG. 2B, an intake unit 124 is provided toward the left side surface 252. The intake unit 124 includes fans for taking in air from the three intake ports 175. The air taken in from the intake ports 175 is guided to the image forming units Pa to Pd via an inner space of the protruding portion 257, the intake unit 124, and a cover unit 125.

Figure 3:
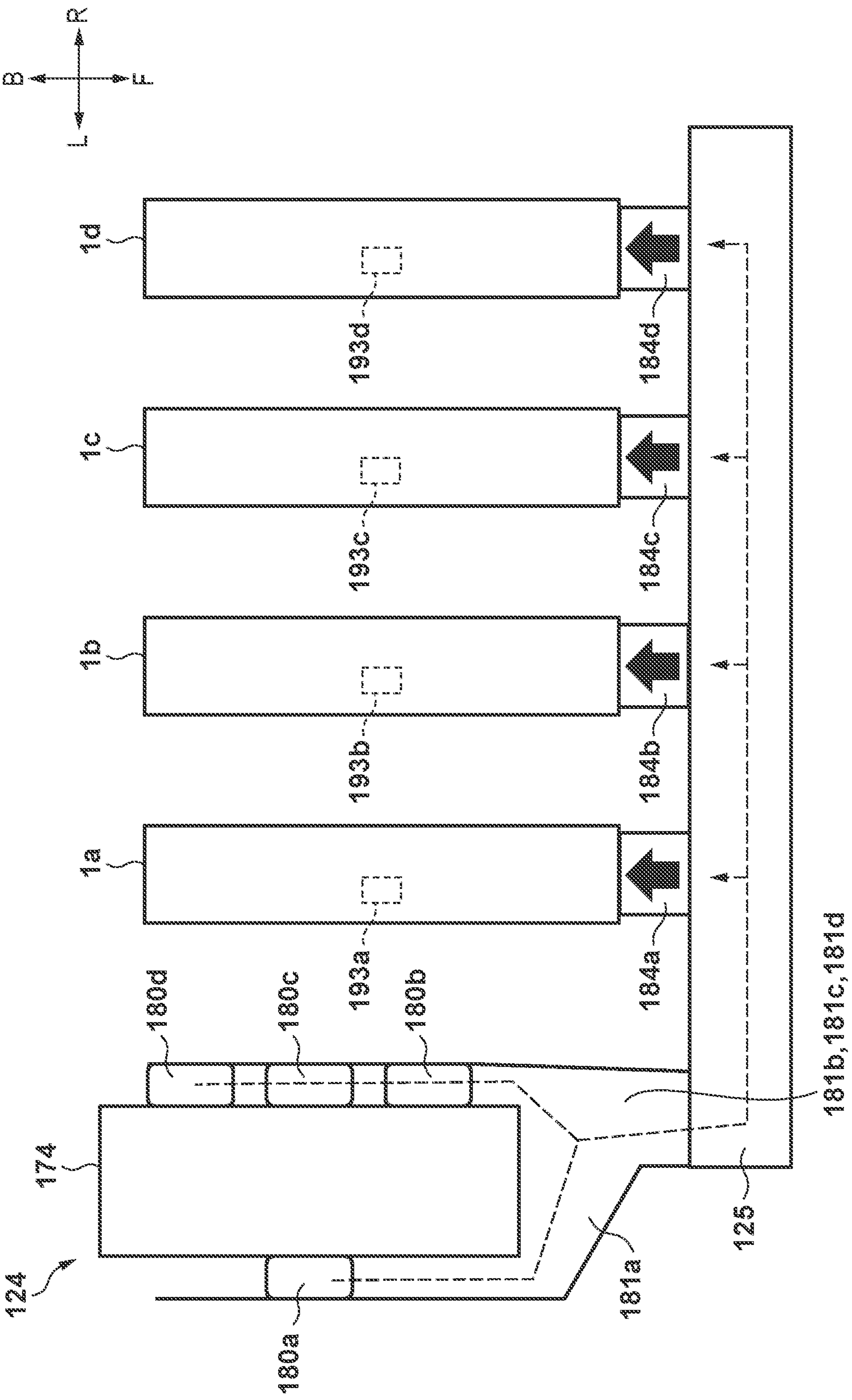
FIG. 3 is diagram illustrating an airflow on an intake side of developing devices.
Figure 4A:
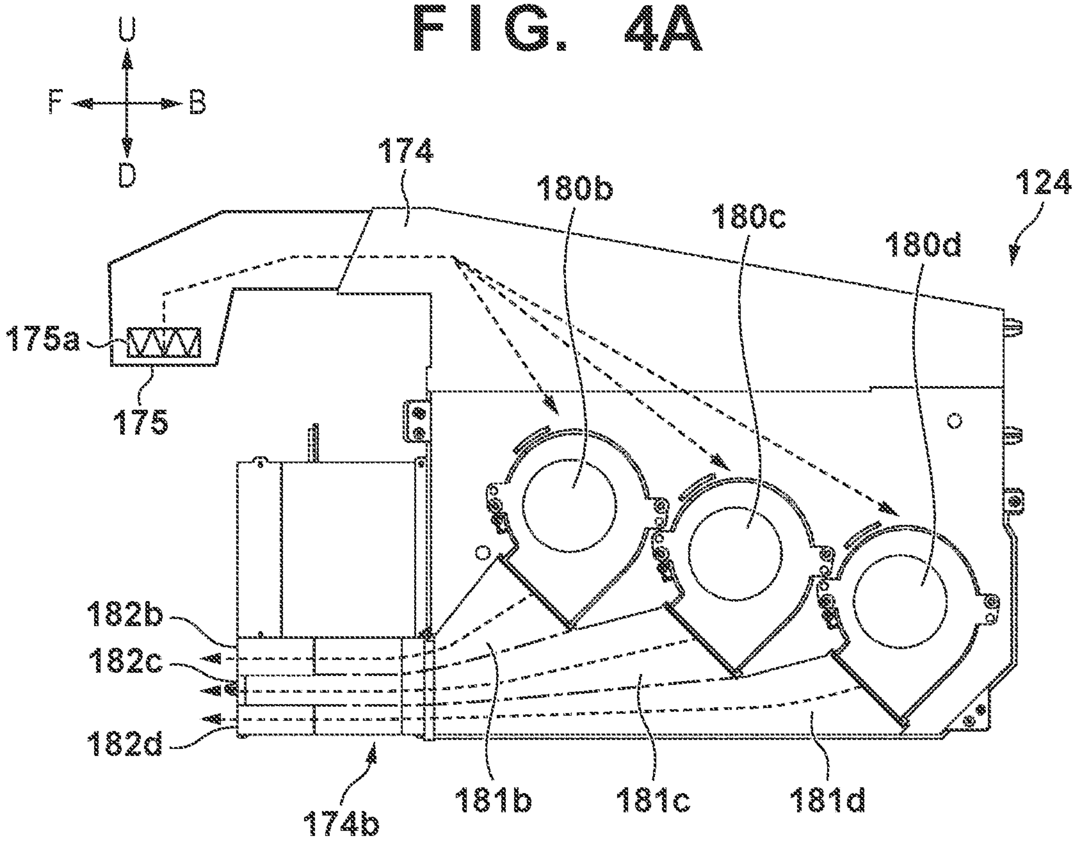
FIG. 4A is a diagram illustrating a right side surface of an intake unit.
Figure 4B:
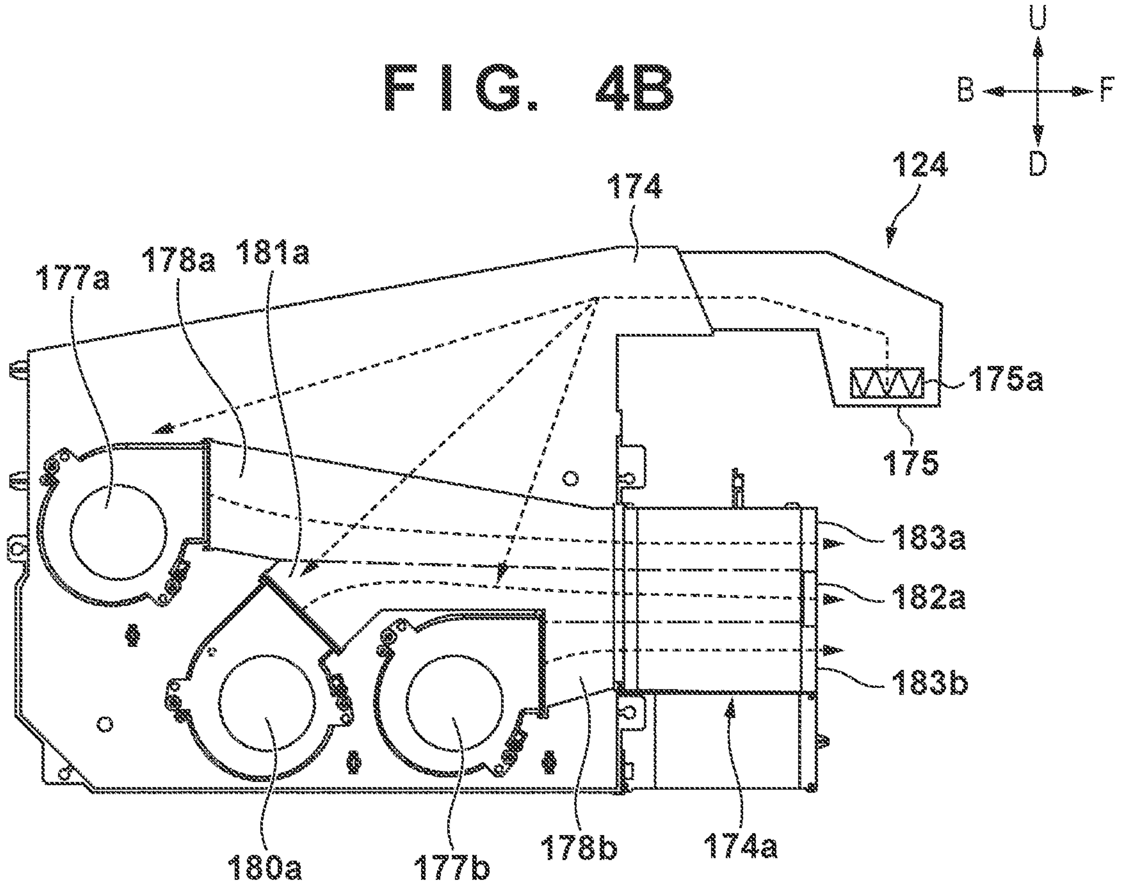
FIG. 4B is a diagram illustrating a left side surface of an intake unit.

FIGS. 3, 4A, and 4B illustrate the intake unit 124. As illustrated in FIG. 3, the intake unit 124 includes a main body duct 174, intake fans 180*a*, 180*b*, 180*c*, and 180*d*, and side ducts 174*a* and 174*b*. The main body duct 174 is a duct in which a space that connects with the three intake ports 175 is formed.

The intake fans 180*b*, 180*c*, and 180*d* and the side duct 174*b* are provided on the right side surface of the main body duct 174. The intake fans 180*b*, 180*c*, and 180*d* are fans for taking in air from the three intake ports 175 and supplying the air to the developing devices 1*b*, 1*c*, and 1*d*, respectively.

A connection portion that connects with the intake fans 180*b*, 180*c*, and 180*d* is formed on the right side surface of the main body duct 174. The air taken in from the intake ports 175 passes through the inside of the main body duct 174 and enters the intake fans 180*b*, 180*c*, 180*d* via the connection portion.

As illustrated in FIGS. 3 and 4A, ducts 181*b*, 181*c*, and 181*d* for the developing devices 1*b*, 1*c*, and 1*d* are formed in the side duct 174*b*. The side duct 174*b* and the intake fan 180*b*, 180*c*, and 180*d* are connected such that upon passing through the intake fans 180*b*, 180*c*, and 180*d*, the air pass through the corresponding ducts 181*b*, 181*c*, 181*d*, respectively. The ducts 181*b*, 181*c*, and 181*d* are independent of each other. The duct 181*b* includes an outlet 182*b*. The duct 181*c* includes an outlet 182*c*. The duct 181*d* includes an outlet 182*d*.

As illustrated in FIGS. 4A and 4B, a filter 175*a* may be provided in the intake port 175. The filter 175*a* removes debris and dust.

As illustrated in FIG. 4B, the intake fan 180*a* and the side duct 174*a* are provided on the left side surface of the main body duct 174 in order to cool the developing device 1*a*. Furthermore, intake fans 177*a* and 177*b* are provided on the left side surface of the main body duct 174. The intake fan 177*a* is a fan for sending air to the charger 2*a*. The intake fan 177*b* is a fan for sending air to the charger 2*b*. A connection portion for connecting the intake fan 180*a*, the intake fans 177*a* and 177*b* and the main body duct 174 is formed on the left side surface of the main body duct 174. The air taken in from the intake ports 175 enters the intake fan 180*a* and the intake fans 177*a* and 177*b* from inside the main body duct 174 via the connection portion.

As illustrated in FIG. 4B, a duct 181*a* for the developing device 1*a* and ducts 178*a* and 178*b* for the chargers 2*a* and 2*b* are formed in the side duct 174*a*. The side duct 174*a* and the intake fan 180*a* are connected such that upon passing through the intake fan 180*a*, the air is guided to the duct 181*a*. The side duct 174*a* and the intake fan 177*a* are connected such that upon passing through the intake fan 177*a*, the air is guided to the duct 178*a*. The side duct 174*a* and the intake fan 177*b* are connected such that upon passing through the intake fan 177*b*, the air is guided to the duct 178*b*. The ducts 181*a*, 178*a*, and 178*b* are independent of each other. The duct 181*a* includes an outlet 182*a*. The duct 178*a* includes an outlet 183*a*. The duct 178*b* includes an outlet 183*b*.

As illustrated in FIG. 3, the air is sent to the developing devices 1*a* to 1*d* via the ducts 181*a* to 181*d*, the cover unit 125, and outlet joints 184*a* to 184*d*. Temperature sensors 193*a* to 193*d* for detecting the temperatures of the developing devices 1*a* to 1*d* are provided in the developing devices 1*a* to 1*d*, respectively.

Figure 5:
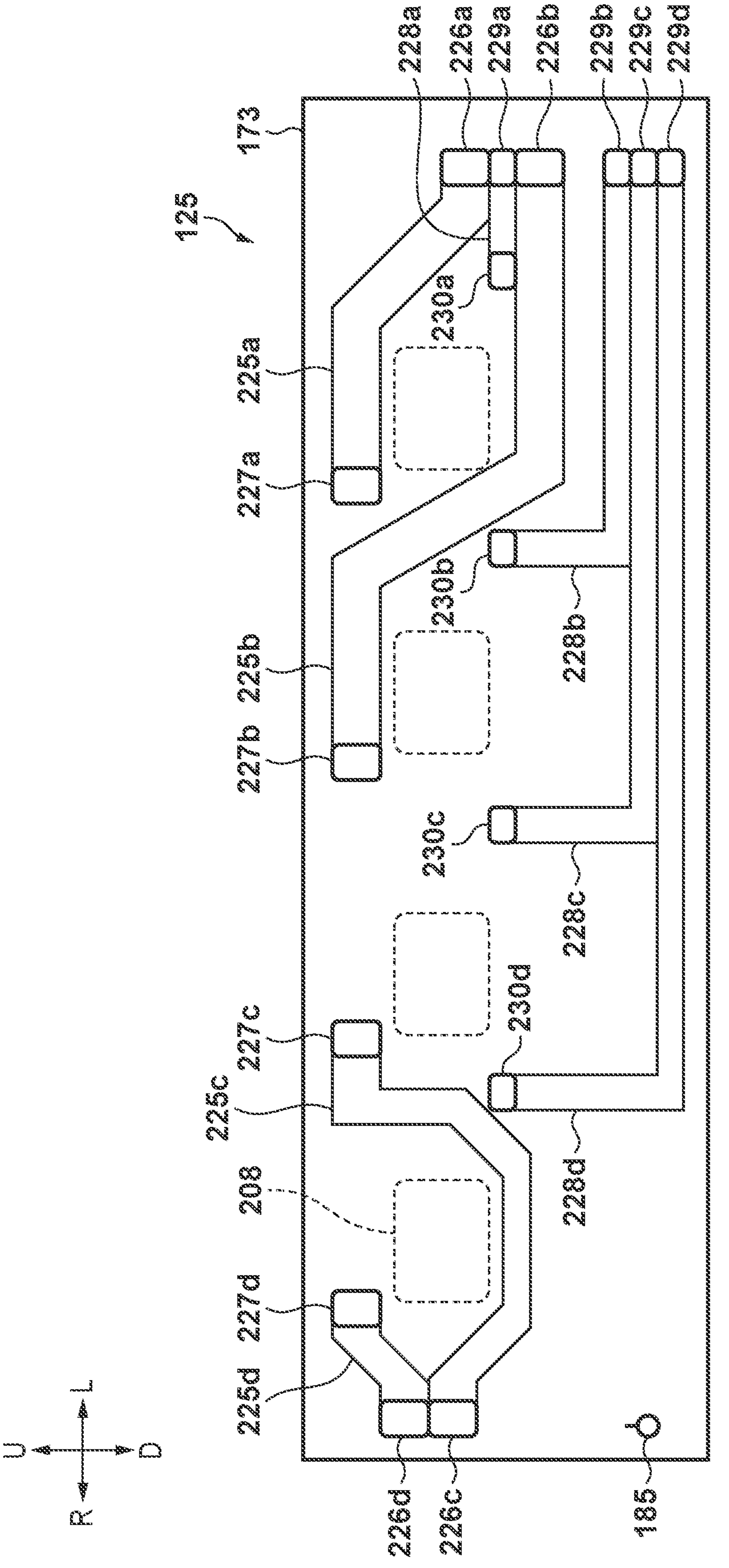
FIG. 5 is a diagram illustrating an inner surface side of a cover unit.

FIG. 5 is a conceptual diagram illustrating an inner surface side of the cover unit 125. Relay ducts 228*a*, 228*b*, 228*c*, 228*d* are installed on the inner surface side of the cover unit 125 and guide air for cooling the developing devices 1*a* to 1*d*. Relay ducts 225*a* and 225*b* are installed on the inner surface side of the cover unit 125 and guide air to the chargers 2*a* and 2*b*. Relay ducts 225*c* and 225*d* are ducts for guiding air taken in from an intake port different from the intake ports 175 to the chargers 2*c* and 2*d*.

An inlet 229*a* of the relay duct 228*a* is connected with the outlet 182*a* of the side duct 174*a*. An outlet 230*a* of the relay duct 228*a* is connected with the outlet joint 184*a*. An inlet 229*b* of the relay duct 228*b* is connected with the outlet 182*b* of the side duct 174*b*. An outlet 230*b* of the relay duct 228*b* is connected with the outlet joint 184*b*. An inlet 229*c* of the relay duct 228*c* is connected with the outlet 182*c* of the side duct 174*b*. An outlet 230*c* of the relay duct 228*c* is connected with the outlet joint 184*c*. An inlet 229*d* of the relay duct 228*d* is connected with the outlet 182*d* of the side duct 174*b*. An outlet 230*d* of the relay duct 228*d* is connected with the outlet joint 184*d*.

An inlet 226*a* of the relay duct 225*a* is connected with the outlet 183*a* of the side duct 174*a*. An outlet 227*a* of the relay duct 225*a* is connected with an outlet joint 188*a* illustrated in FIG. 6. An inlet 226*b* of the relay duct 225*b* is connected with the outlet 183*b* of the side duct 174*a*. An outlet 227*b* of the relay duct 225*b* is connected with an outlet joint 188*b* illustrated in FIG. 6.

Figure 6:
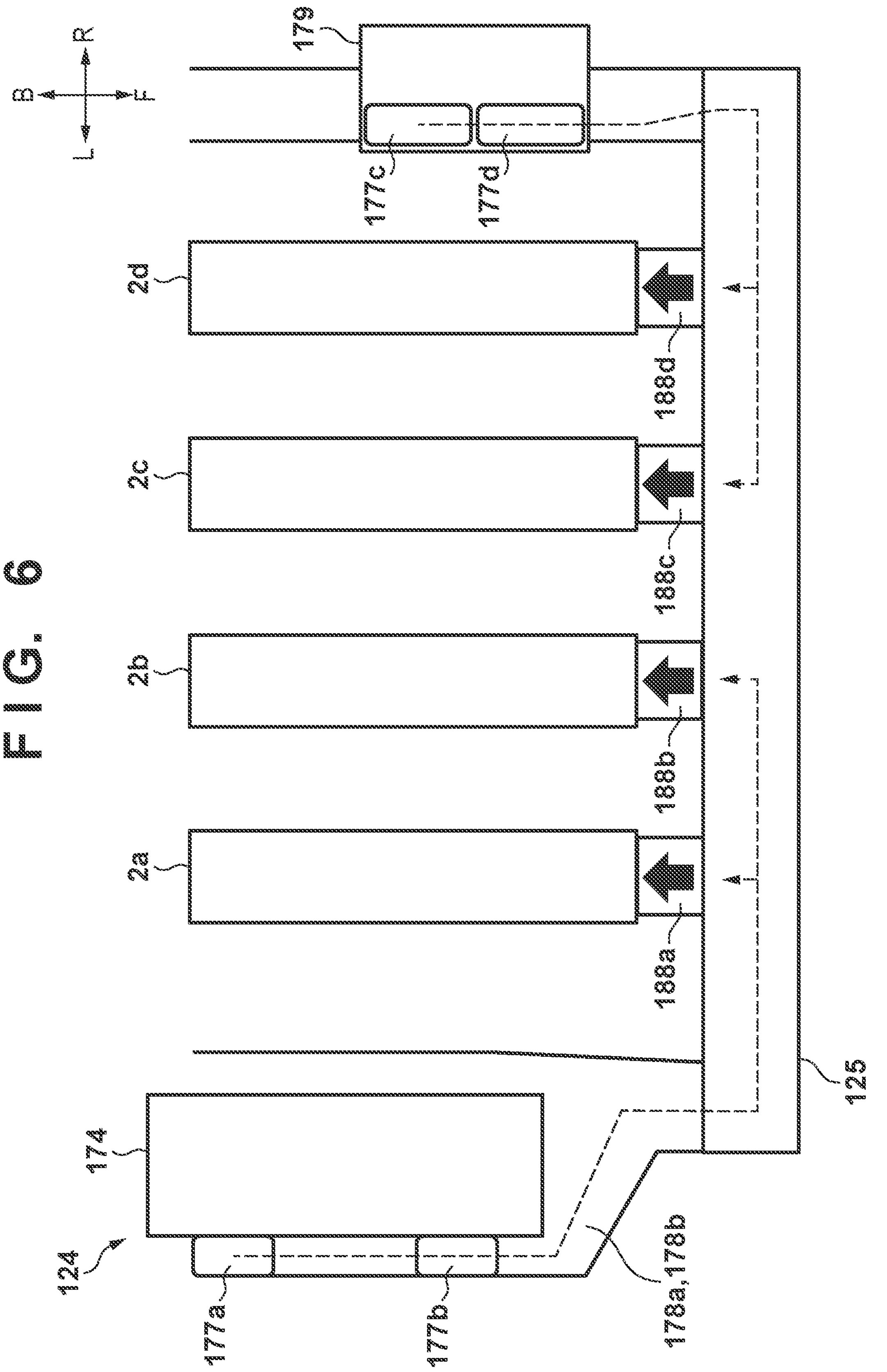
FIG. 6 is a schematic diagram illustrating an airflow configuration on an intake side of a charger.

An inlet 226*c* of the relay duct 225*c* is connected with an outlet of a main body duct 179, which is on the right side, illustrated in FIG. 6. Intake fans 177*c* and 177*d* are provided in the main body duct 179. The intake fan 177*c* is a fan for supplying air to the charger 2*c*. The intake fan 177*d* is a fan for supplying air to the charger 2*d*. An outlet 227*c* of the relay duct 225*c* is connected with an outlet joint 188*c* illustrated in FIG. 6. An inlet 226*d* of the relay duct 225*d* is connected with the outlet of the main body duct 179. An outlet 227*d* of the relay duct 225*d* is connected with an outlet joint 188*d* illustrated in FIG. 6.

Figure 7A:
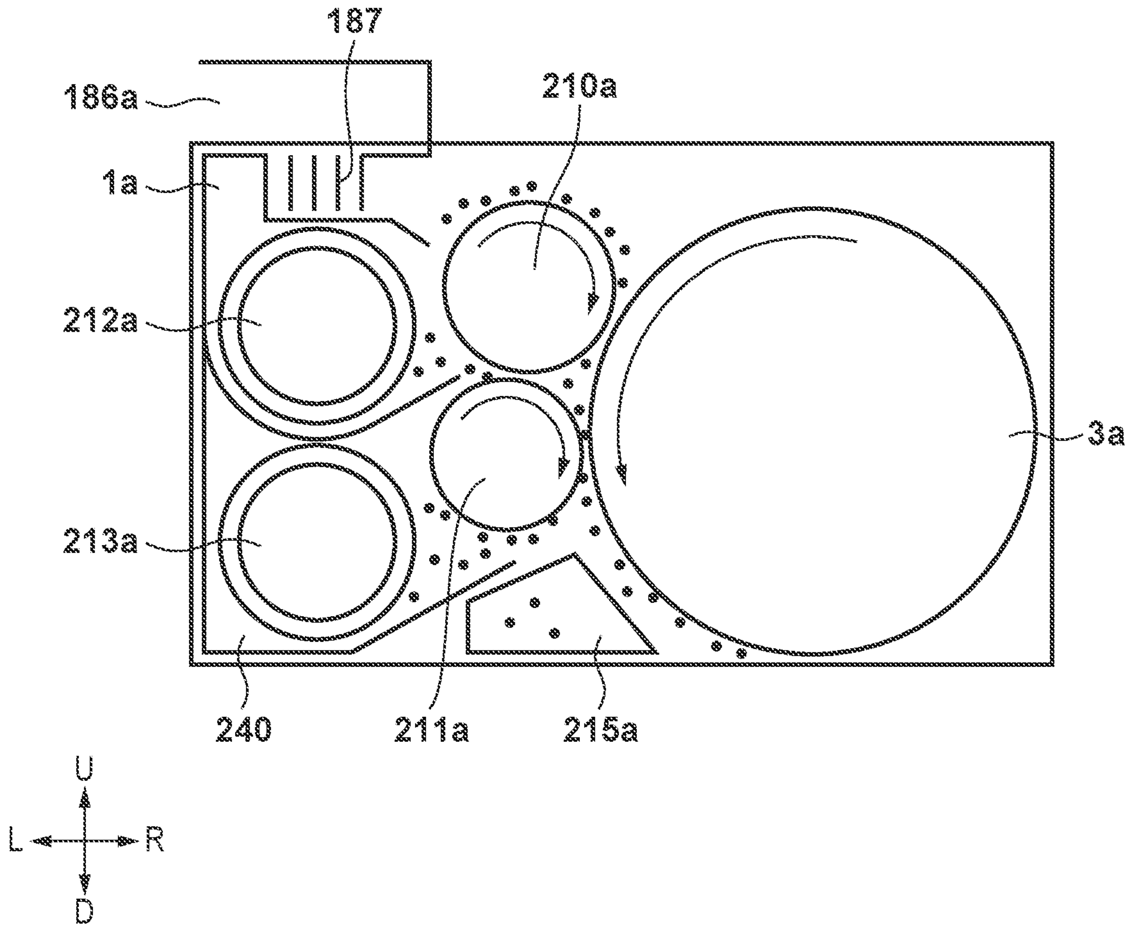
FIGS. 7A and 7B are diagrams illustrating an airflow of the developing devices.
Figure 7B:
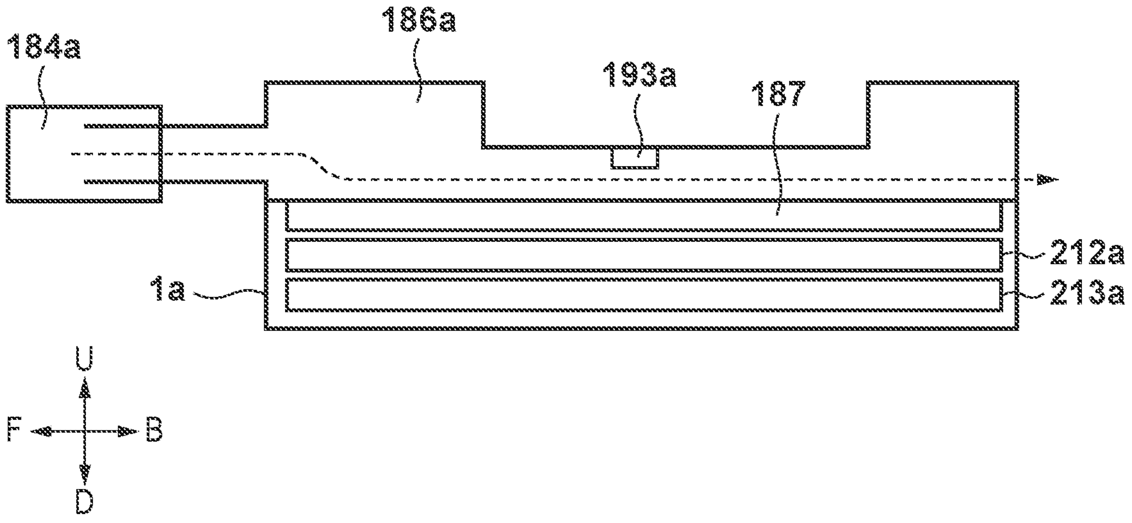

FIG. 7A is a cross-sectional view for explaining an airflow of the developing device 1*a*. FIG. 7B is a cross-sectional view for explaining an airflow of the developing device 1*a*. Since the structures of the developing devices 1*a* to 1*d* are basically the same, the developing device 1*a* will be described as representative of these.

As illustrated in FIG. 7A, the developing device 1*a* includes an upper sleeve 210*a*, a lower sleeve 211*a*, and conveyance screws 212*a*, and 213*a*. The upper sleeve 210*a* and the lower sleeve 211*a* carry developer and rotate, thereby supplying the developer to the photosensitive drum 3*a*. The conveyance screws 212*a* and 213*a* circulate and convey the developer in opposite directions from each other in the developing device 1*a* while mixing the developer in a mixing chamber 240. A collection duct 215*a* is a duct for collecting scattered toner.

As illustrated in FIG. 7B, a cooling duct 186*a* is provided above the developing device 1*a*. A heat sink 187 is provided below the cooling duct 186*a* and above the conveyance screw 212*a*. A lengthwise direction of the heat sink 187 is parallel to rotational shafts of the conveyance screws 212*a* and 213*a*. A widthwise direction of the heat sink 187 is orthogonal to the rotational shafts of the conveyance screws 212*a* and 213*a*. As illustrated in FIG. 7A, the heat sink 187 is closer to the conveyance screws 212*a* and 213*a* in a left-right direction than the upper sleeve 210*a* and the lower sleeve 211*a*. In other words, the cooling duct 186*a* blows air onto the heat sink 187 at a position closer to the conveyance screws 212*a* and 213*a* than the upper sleeve 210*a* and the lower sleeve 211*a*.

As illustrated in FIG. 7B, the cooling duct 186*a* is parallel to the rotational shafts of the conveyance screws 212*a* and 213*a* and is formed along the developing device 1*a*. Upon passing through the outlet joint 184*a*, the air is discharged from the back surface 253 through the cooling duct 186*a*. The heat sink 187 is cooled by an airflow through the cooling duct 186*a*. The developing device 1*a* is indirectly cooled by the heat sink 187 disposed above the conveyance screw 212*a* being cooled. That is, heat generated by rotation of the conveyance screws 212*a* and 213*a* is propagated through the heat sink 187 to the air flowing through the cooling duct 186*a* and is discharged out of the image forming apparatus 100.

In addition, the air flowing to the developing devices 1*a* to 1*d* collects scattered toner. In the image forming unit 700, toner images are formed by toner being supplied from the developing devices 1*a* to 1*d* to the photosensitive drums 3*a* to 3*d*. Part of the toner (referred to as scattered toner) supplied from the developing devices 1*a* to 1*d* is scattered without being adhered to the photosensitive drums 3*a* to 3*d*.

The toner is supplied to the photosensitive drum 3*a* by the upper sleeve 210*a* and the lower sleeve 211*a*; however, remaining toner not supplied to the photosensitive drum 3*a* is collected into the mixing chamber 240. However, part of the toner not supplied to the photosensitive drum 3*a* may be scattered out of the developing device 1*a* without being collected into the mixing chamber 240. The scattered toner may soil the inside of the image forming apparatus 100 and cause an image defect. Therefore, a toner collection unit for collecting the scattered toner using air may be provided.

Figure 8A:
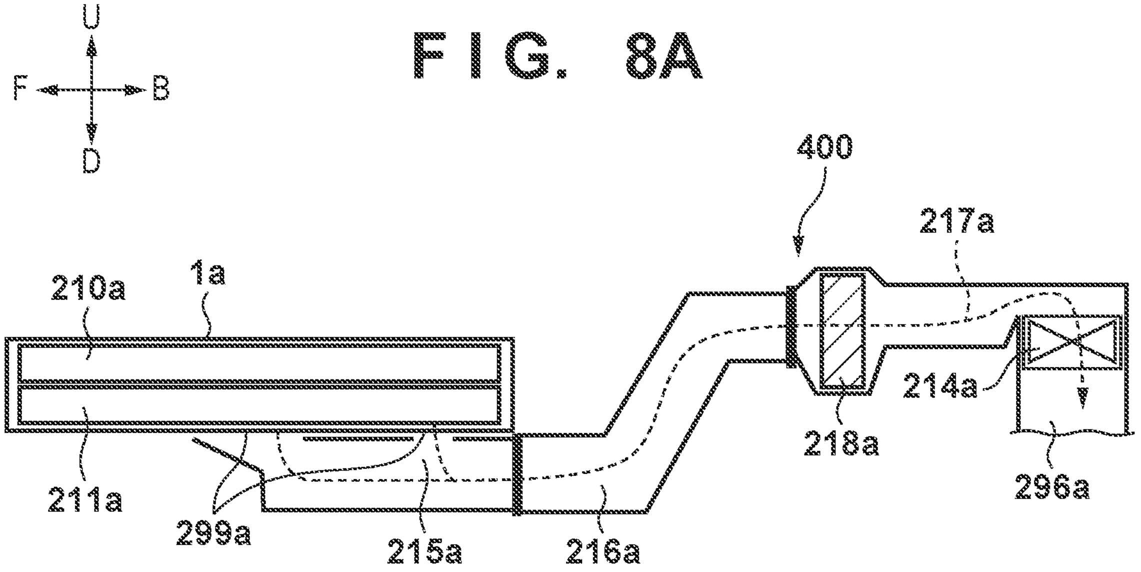
FIGS. 8A and 8B are diagram illustrating an airflow on an exhaust side of developing devices.
Figure 8B:
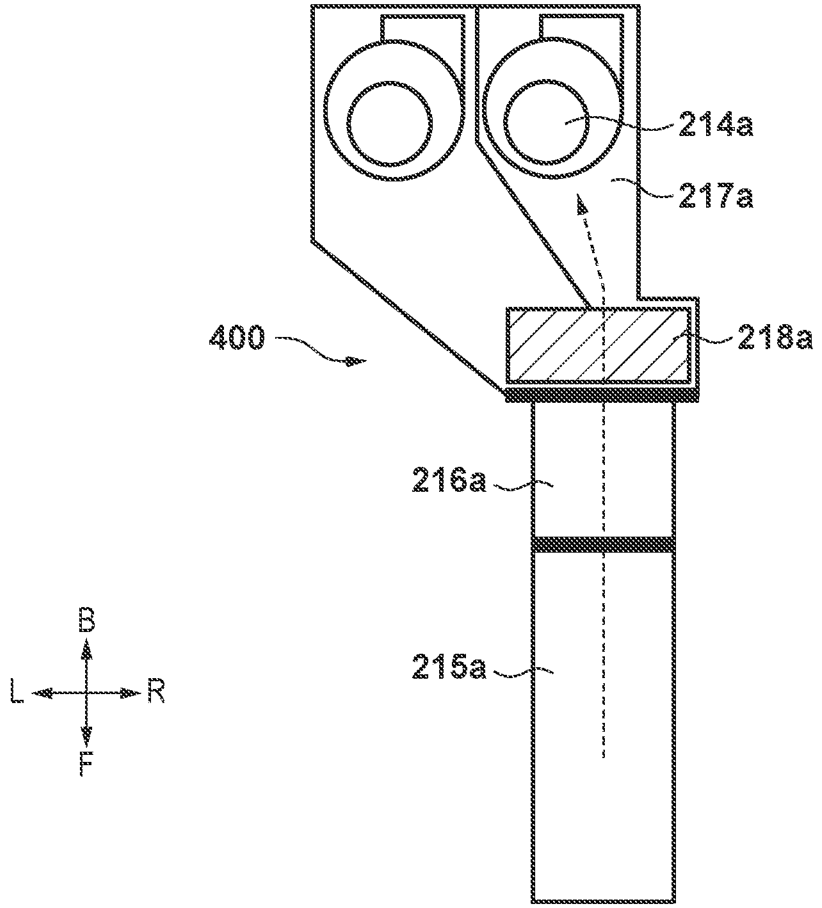

As illustrated in FIGS. 8A and 8B, a toner collection unit 400 is disposed near the back surface 253 of the first housing 101*a*. The toner collection unit 400 includes an exhaust duct 217*a*, an exhaust fan 214*a*, and a toner collection filter 218*a*. The exhaust fan 214*a* and the toner collection filter 218*a* are provided in the exhaust duct 217*a*. A collection duct 215*a* is disposed below the lower sleeve 211*a*. The collection duct 215*a* extends parallel to the rotational shaft of the lower sleeve 211*a*. A plurality of collection ports 299*a* are formed in the collection duct 215*a*. Toner scattered below the lower sleeve 211*a* enters the collection duct 215*a* from the collection ports 299*a*.

The collection duct 215*a* and the exhaust duct 217*a* are connected by a relay duct 216*a*. Air that includes scattered toner is discharged out of the image forming apparatus 100 from the collection duct 215*a* through the relay duct 216*a* and the exhaust duct 217*a* by an airflow generated by the exhaust fan 214*a*. The toner collection filter 218*a* is disposed in the exhaust duct 217*a* between the relay duct 216*a* and the exhaust fan 214*a*. Therefore, the toner is removed from the air when the air passes through the toner collection filter 218*a*, and the air from which the toner has been removed is discharged out of the image forming apparatus 100 from an exhaust port 296*a*. Regarding the airflow, the developing devices 1*a* to 1*d* have similar configurations. That is, the above description also describes the developing devices 1*b* to 1*d* if the letters at the end of the reference numerals are changed from a to b through d.

Figure 9A:
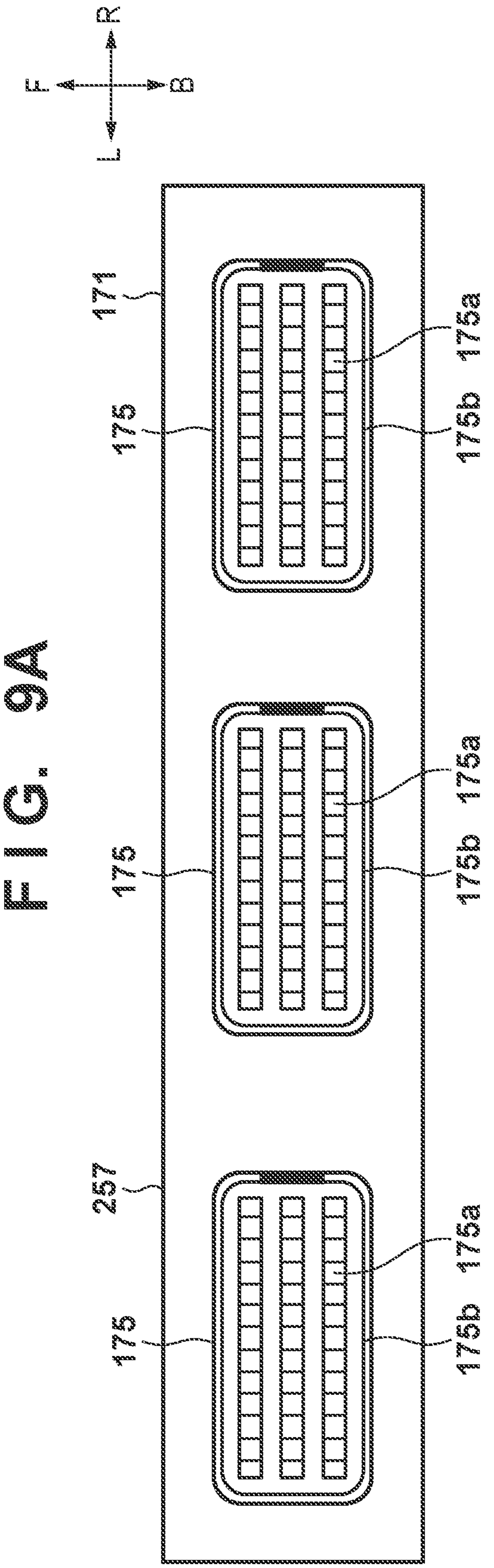
FIGS. 9A and 9B are diagrams illustrating intake ports.
Figure 9B:
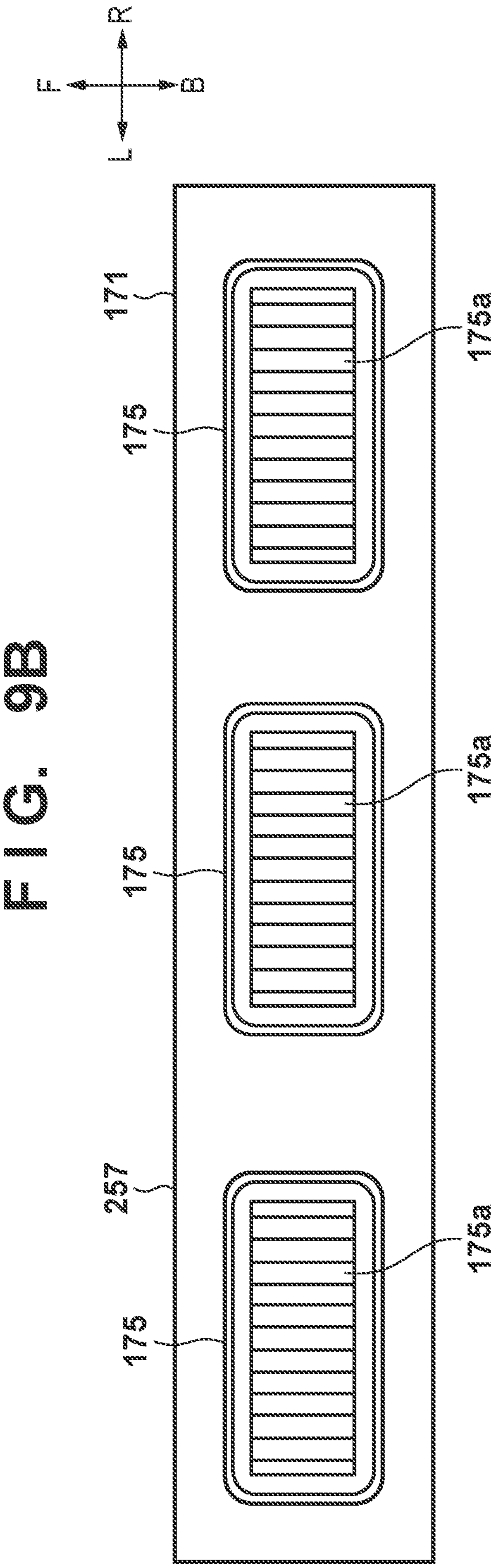
Figure 10:
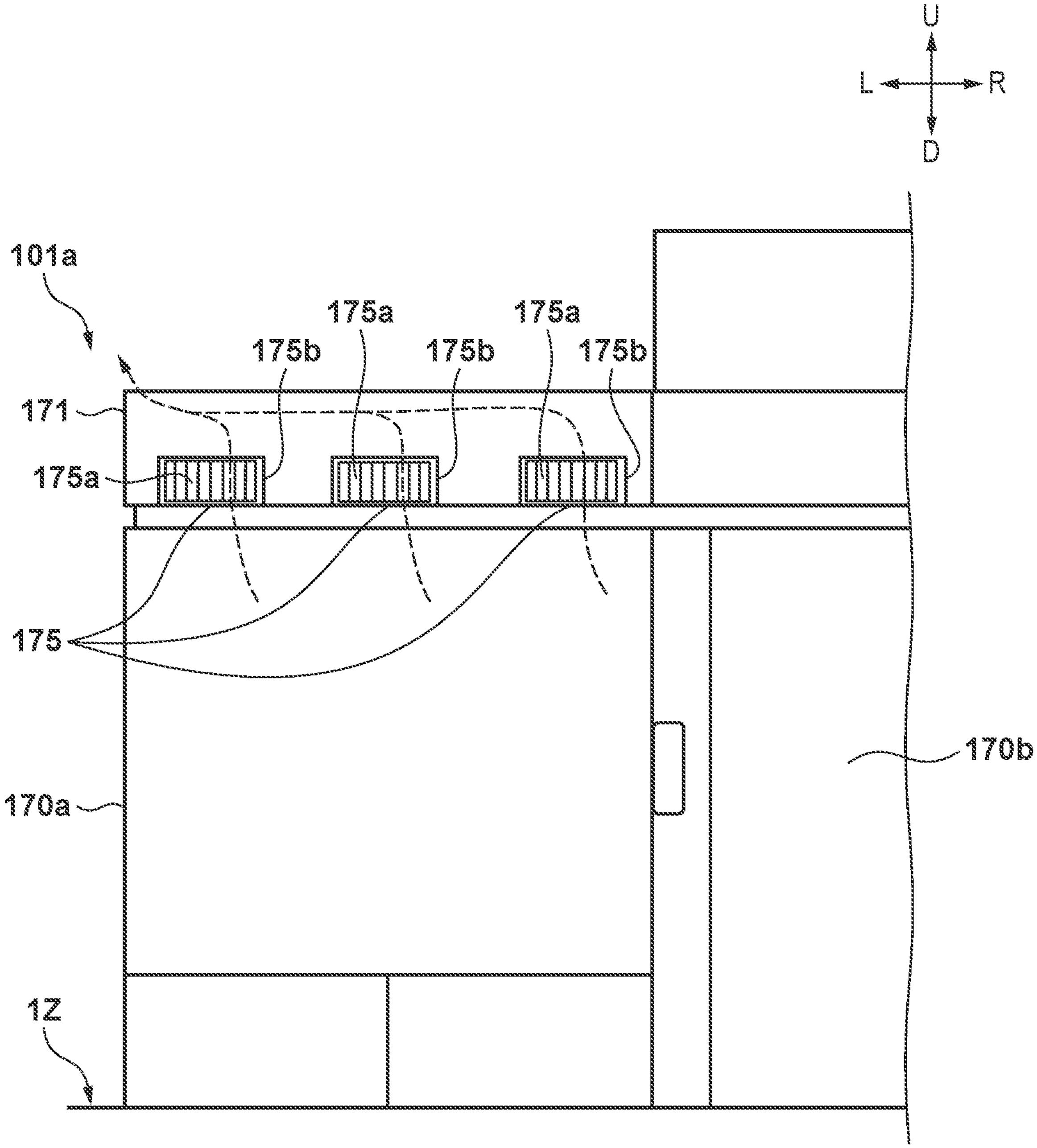
FIG. 10 is a diagram illustrating intake from the intake ports.

FIGS. 9A, 9B, and 10 are diagrams illustrating the intake ports 175. FIG. 9A illustrates a lower surface of the protruding portion 257 of the top surface cover 171. A holder 175*b* is a holding member for holding the filter 175*a*. The holder 175*b* is integrated with the filter 175*a* and can be attached and detached to and from the intake port 175.

FIG. 9B illustrates the lower surface of the protruding portion 257 in a state in which the holder 175*b* is hidden for the sake of descriptive convenience. The filter 175*a* is attached so as to cover the intake port 175. When air passes through the filter 175*a*, dust and the like larger than a vent hole of the filter 175*a* cannot pass through the filter 175*a*. Therefore, by mounting the filter 175*a* dust is prevented from entering into the first housing 101*a*.

The filter 175*a* is held by the holder 175*b*. Therefore, the user or a person in charge of service can easily replace the filter 175*a* by removing the holder 175*b* from the intake port 175.

FIG. 10 is a front view of the first housing 101*a*. The filters 175*a* and the holders 175*b* are not visible from the front of the first housing 101*a*. Here, in order to describe a height of the filter 175*a* and a height of the holder 175*b*, FIG. 10 is rendered as a perspective view.

As illustrated in FIG. 10, the intake ports 175 are disposed directly above the left front door 170*a*. Further, the intake ports 175 are disposed facing downward. That is, a direction of the normal of an opening surface of the intake ports 175 faces downward (vertical direction).

There is a space between a bottom surface of the protruding portion 257 of the top surface cover 171 and a top surface of the left front door 170*a*. The intake ports 175 are connected with this space. The intake ports 175 take in air from this space and send the air to the intake unit 124.

The intake ports 175 are sufficiently spaced apart from an installation surface 1Z of the image forming apparatus 100. Therefore, the intake ports 175 do not easily suck in dust deposited on the installation surface 1Z. Therefore, dust is prevented from entering from outside of the first housing 101*a* into the image forming apparatus 100.

The intake ports 175 are provided on the bottom surface of the protruding portion 257 rather than on a front surface of the protruding portion 257. Thus, the intake ports 175 do not easily enter a field of view of an operator, and an aesthetic appearance of the image forming apparatus 100 is not easily spoiled. Furthermore, an operation sound of the image forming apparatus 100 from the intake ports 175 is less audible compared to a case where the intake ports 175 are on the front of the protruding portion 257.

Next, an airflow related to the chargers 2*a* and 2*b* supported in the first housing 101*a* will be described. Regarding an airflow of the chargers 2*c* and 2*d*, an intake port different from the intake ports 175 takes in air, and so a description thereof will be omitted.

Figure 11:
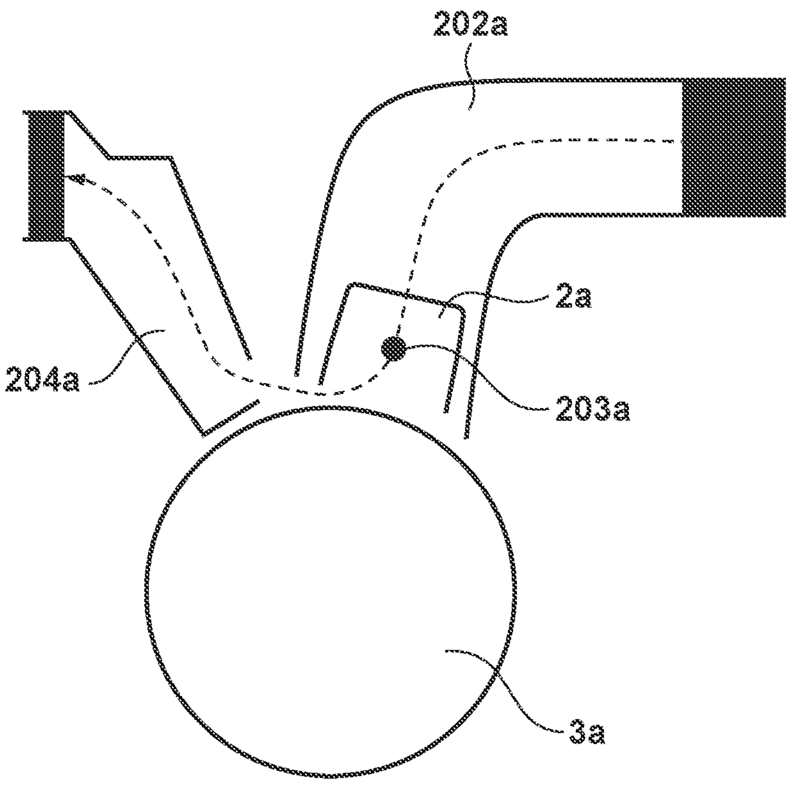
FIG. 11 is diagram illustrating an airflow of the charger.

FIG. 11 illustrates the charger 2*a*. Since the chargers 2*a* and 2*b* have substantially the same structure, the charger 2*a* will be explained as representative of these. A charged wire 203*a* performs corona discharge. Therefore, the air around the charged wire 203*a* is ionized, thereby becoming ions. The surface of the photosensitive drum 3*a* is thus charged. Since ions are generated by ionization of air, air needs to be sent to the charger 2*a*. To send air to the charger 2*a*, a primary intake duct 202*a* is disposed near the charger 2*a*.

Figure 12A:
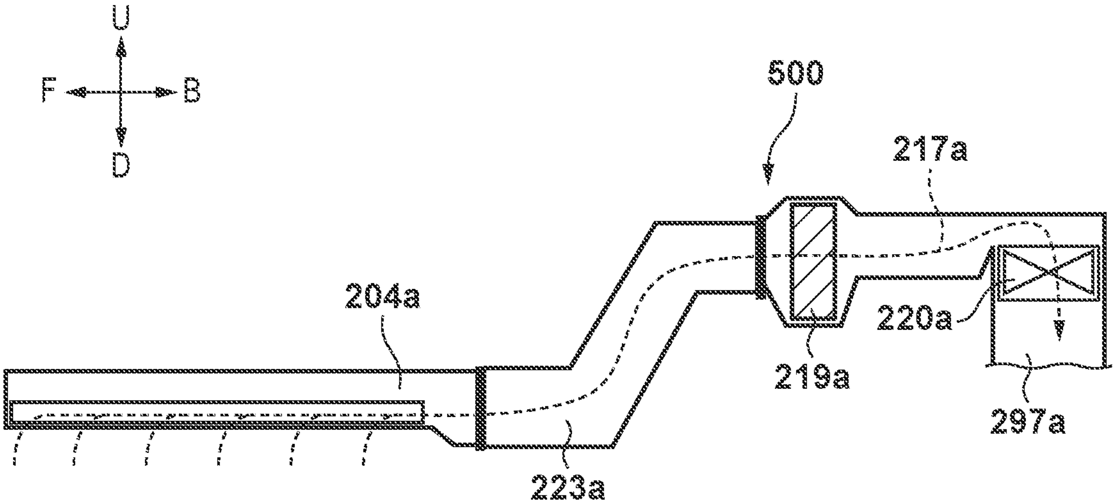
FIGS. 12A and 12B are diagrams illustrating an airflow on an exhaust side of the charger.

The charger 2*a* generates not only ions but also ozone at the time of corona discharge. Ozone tends to corrode metals (e.g., grids made of stainless steel) and the like included in the charger 2*a*. Therefore, ozone needs to be collected. Thus, an ozone collection filter 219*a* for collecting ozone is provided (FIG. 12A). As illustrated in FIG. 11, a primary exhaust duct 204*a* is disposed near the charger 2*a*.

The airflow from the intake ports 175 to the chargers 2*a* and 2*b* is as described with reference to FIGS. 4B, 5 and 6. The air taken in from the intake ports 175 is sent to the chargers 2*a* and 2*b* via the main body duct 174, the intake fans 177*a* and 177*b*, the ducts 178*a* and 178*b*, and the relay ducts 225*a* and 225*b*. The relay duct 225*a* is connected to the primary intake duct 202*a* via the outlet joint 188*a*. The air taken in from the intake ports 175 is thus supplied to the chargers 2*a* and 2*b*.

Figure 12B:
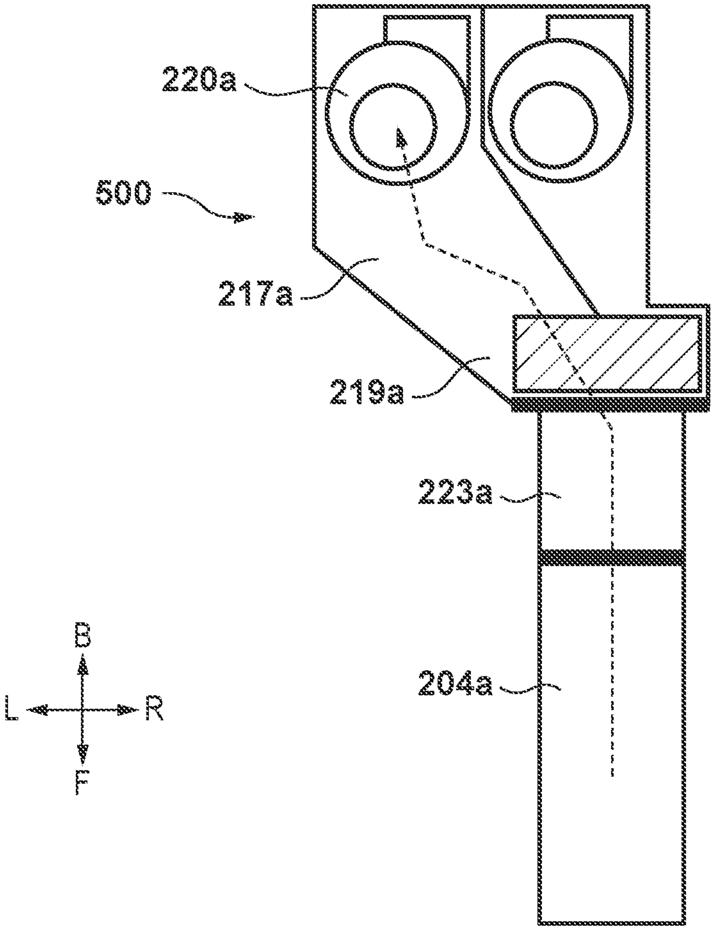

FIG. 12A and FIG. 12B illustrate an airflow on an exhaust side of the chargers 2*a* to 2*d*. Here, the charger 2*a* is described as representative of the chargers 2*a* to 2*d*. An ozone collection unit 500 is disposed near the back surface 253 of the first housing 101*a* in order to remove ozone. The ozone collection unit 500 includes an exhaust duct 217*a*, which can be shared with the toner collection unit 400; an exhaust fan 220*a*; and the ozone collection filter 219*a*. The exhaust fan 220*a* and the ozone collection filter 219*a* are provided in the exhaust duct 217*a*.

The primary exhaust duct 204*a* and the exhaust duct 217*a* are connected via a relay duct 223*a*. By an airflow generated by the exhaust fan 220*a*, air that includes ozone passes from the primary exhaust duct 204*a* through the relay duct 223*a* and the exhaust duct 217*a* and is discharged out of the image forming apparatus 100 from an exhaust port 297*a*. The ozone collection filter 219*a* is disposed in a path (e.g., the exhaust duct 217*a*) between the relay duct 223*a* and the exhaust fan 220*a*. Therefore, ozone is removed from the air when the air passes through the ozone collection filter 219*a*, and the air from which ozone has been removed is discharged out of the image forming apparatus 100.

Fan Control

Figure 13:
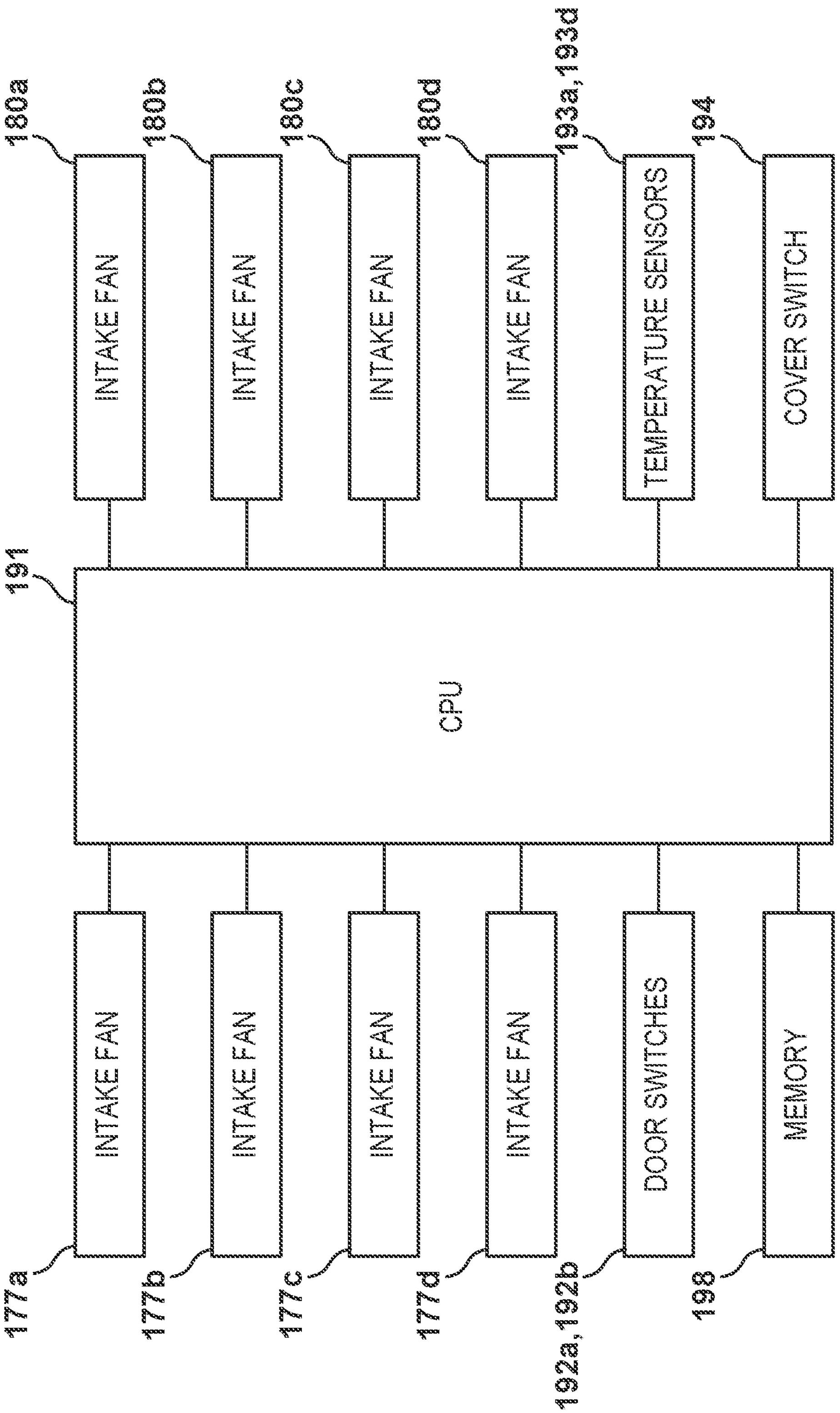

FIG. 13 is a block diagram illustrating a circuit involved in control of fans of the image forming apparatus 100. A CPU 191 executes a control method according to a program stored in a memory 198. The intake fans 177*a* to 177*d* and the door switches 192*a* and 192*b* are connected to the CPU 191. The intake fans 180*a* to 180*d*, the cover switch 194, and the temperature sensors 193*a* to 193*d* are further connected to the CPU 191.

The CPU 191 determines an open/closed state (protective state/non-protective state) of the left front door 170*a* based on the detection result of the door switch 192*a*. The CPU 191 determines the open/closed state (protective state/non-protective state) of the right front door 170*b* based on the detection result of the door switch 192*b*. The CPU 191 recognizes the respective temperatures of the developing devices 1*a* to 1*d* based on the detection results of the temperature sensors 193*a* to 193*d*. The CPU 191 determines an attached/detached state (protective state/non-protective state) of the cover 173 based on the detection result of the cover switch 194. A person in charge of maintenance can switch between a locked state and an unlocked state by rotating the lock lever 185. The cover switch 194 outputs a detection signal indicating that the cover 173 is in an attached state when the lock lever 185 is in the locked state.

Figure 14A:
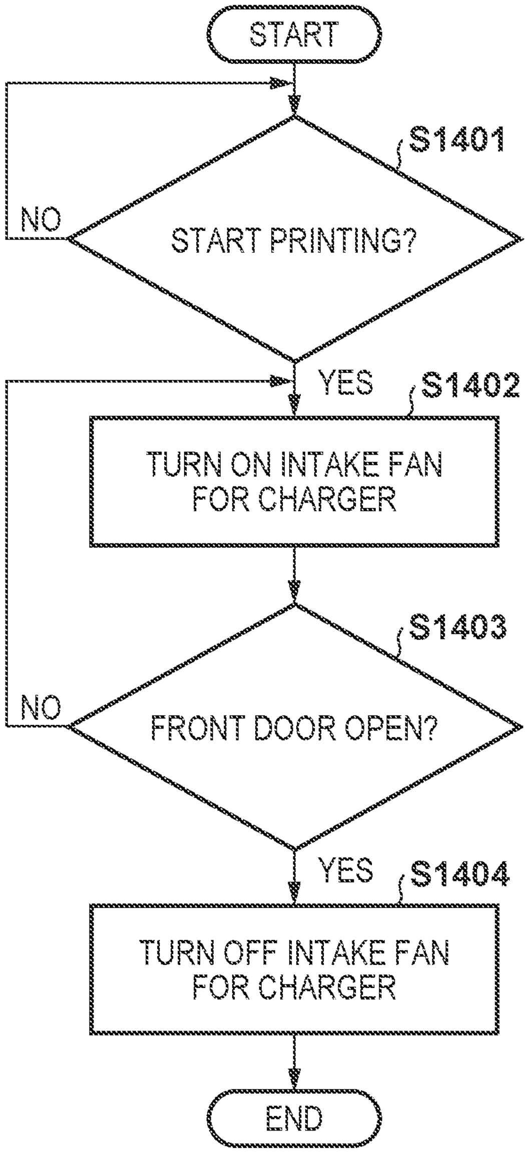
FIGS. 14A and 14B are flowcharts for explaining a method of controlling intake fans.

FIG. 14A is a flowchart for explaining a method of controlling the intake fans 177*a* to 177*d* for the chargers 2*a* to 2*d*. The CPU 191 executes the following processing according to a program stored in the memory 198.

In step S1401, the CPU 191 determines whether a print start has been instructed from the operation unit 200 or the like. When a print start is instructed, the CPU 191 advances the processing to step S1402.

In step S1402, the CPU 191 turns on the intake fans 177*a* to 177*d*.

In step S1403, the CPU 191 determines whether a front door (left front door 170*a* or right front door 170*b*) is open based on the detection result of the door switches 192*a* and 192*b*. A state in which the left front door 170*a* or the right front door 170*b* is closed corresponds to a protective state. A state in which the left front door 170*a* or the right front door 170*b* is open corresponds to a non-protective state. If at least one of the door switches 192*a* and 192*b* is open, the CPU 191 advances the processing to step S1404. Meanwhile, if both of the door switches 192*a* and 192*b* are closed, the CPU 191 advances the processing to step S1402.

In step S1404, the CPU 191 turns off (stops) the intake fans 177*a* to 177*d*. The rotation speed of the intake fans 177*a* to 177*d* may be lowered to be less than a prescribed rotation speed. The prescribed rotation speed may be determined, for example, based on an outside air temperature or based on an internal temperature of the image forming apparatus 100. For example, a lowered rotation speed is, for example, a rotation speed at which unfixed toner will not be sucked in.

Figure 15:
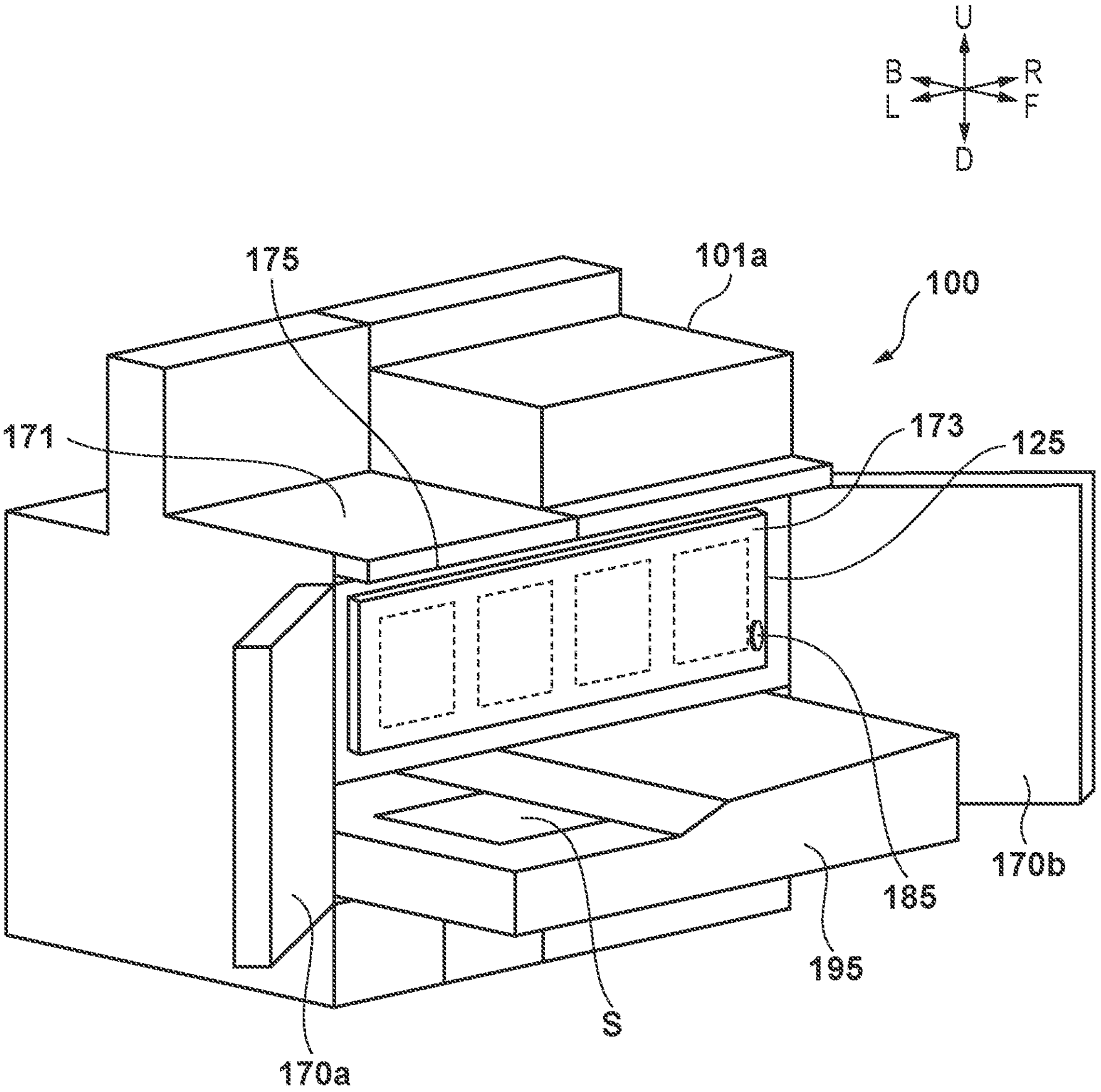
FIG. 15 is a diagram illustrating a state in which a conveyance unit is pulled out.

FIG. 15 illustrates a state in which a conveyance unit 195 for conveying the sheet S stored in the cassette 10 to the secondary transfer unit T2 is pulled out forward. The conveyance unit 195 may include a conveyance roller or a conveyance belt that conveys the sheet S. Upon detecting a jam of the sheet S, the CPU 191 displays warning information on the operation unit 200. The warning information includes, for example, information indicating that a sheet jam has occurred and a message prompting removal of the sheet S that has become jammed. The user opens the left front door 170*a* and the right front door 170*b* and then pulls out the conveyance unit 195 forward according to the message.

There is unfixed toner on a surface of the sheet S removed from the conveyance unit 195. The intake fans 177*a* and 177*b* may suck in the unfixed toner from the intake ports 175 together with air. The unfixed toner sucked in from the intake ports 175 may adhere to the chargers 2*a* and 2*b*. This may reduce the charging performance of the chargers 2*a* and 2*b* and cause image defects. Therefore, when the left front door 170*a* or the right front door 170*b* is open, the CPU 191 stops the intake fans 177*a* and 177*b*. This reduces image defects caused by soiling of the chargers 2*a* and 2*b*.

The intake fans 177*c* and 177*d* may be kept on when the left front door 170*a* or the right front door 170*b* is open; however, they may be turned off along with the intake fans 177*a* and 177*b*. If the intake ports of the intake fans 177*c* and 177*d* are at positions (e.g., the lower surface of the protruding portion 257) at which unfixed toner is easily sucked in, the intake fans 177*c* and 177*d* operate in conjunction with the intake fans 177*a* and 177*b*. If the intake ports of the intake fans 177*c* and 177*d* are at positions (e.g., the back surface 253 or the right side surface 254) at which unfixed toner is not easily sucked in, the intake fans 177*c* and 177*d* may be controlled separately from the intake fans 177*a* and 177*b*. That is, the intake fans 177*c* and 177*d* may be kept on even when the left front door 170*a* or right front door 170*b* is open.

Figure 14B:
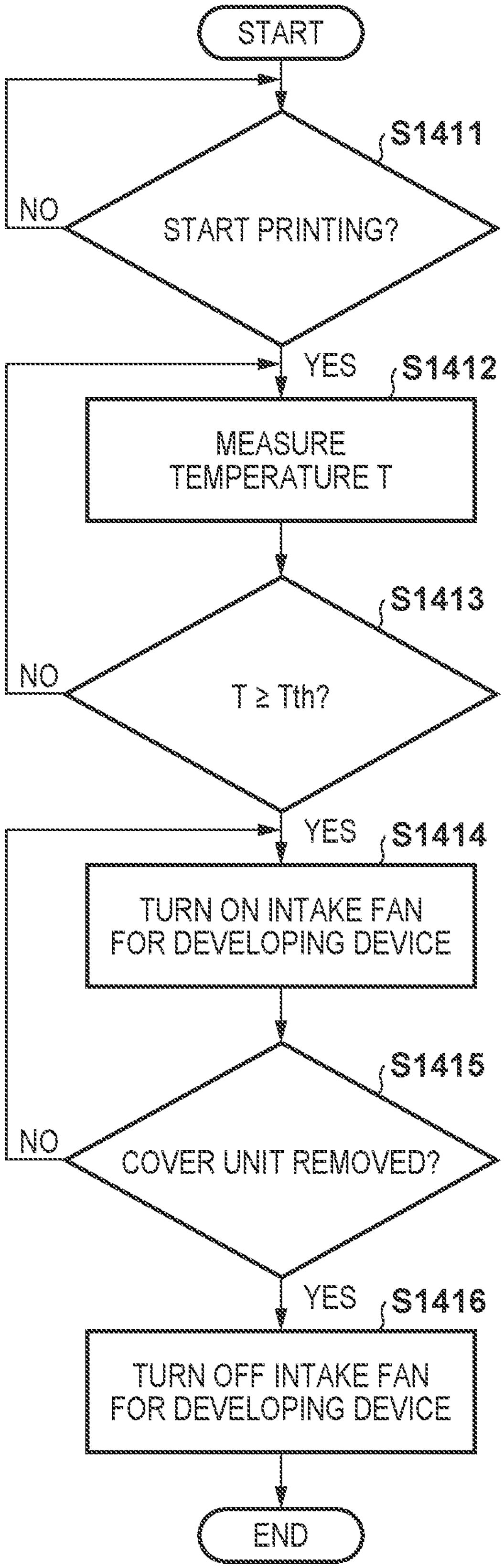

FIG. 14B is a flowchart for explaining a method of controlling the intake fans 180*a* to 180*d* for the developing devices 1*a* to 1*d*. The CPU 191 executes the following processing according to a program stored in the memory 198. The method of controlling the intake fans 177*a* and 177*b* for the chargers 2*a* and 2*b* and the method of controlling the intake fans 180*a* to 180*d* are concurrently executed. Further, the intake fans 180*a* to 180*d* may each be independently controlled. Therefore, a method of controlling the intake fan 180*a* among the intake fans 180*a* to 180*d* will be described below. The method of controlling the intake fans 180*b* to 180*d* is the same as the method of controlling the intake fan 180*a*.

In step S1411, the CPU 191 determines whether a print start has been instructed from the operation unit 200 or the like. When a print start is instructed, the CPU 191 advances the processing to step S1412.

In step S1412, the CPU 191 measures a temperature T of the developing device 1*a* using the temperature sensor 193*a*.

In step S1413, the CPU 191 determines whether the temperature T is greater than or equal to a threshold temperature Th. If the temperature T is less than the threshold temperature Th, the CPU 191 advances the processing to step S1412. If the temperature T is greater than or equal to the threshold temperature Th, the CPU 191 advances the processing to step S1414.

In step S1414, the CPU 191 turns on the intake fan 180*a* for the developing device 1*a*. The developing device 1*a* is thus cooled.

In step S1415, the CPU 191 determines whether the cover unit 125 has been removed based on the detection result of the cover switch 194. If the cover unit 125 is attached to the image forming apparatus 100, the CPU 191 advances the processing to step S1414. If the cover unit 125 is detached from the image forming apparatus 100, the CPU 191 advances the processing to step S1416.

In step S1416, the CPU 191 turns off (stop) the intake fan 180*a* for the developing device 1*a*.

The intake fans 180*a* to 180*d* for the developing devices 1*a* to 1*d* may be controlled independently of the open/closed states of the left front door 170*a* and the right front door 170*b*. This is because it hardly becomes a problem even if unfixed toner sucked in from the intake ports 175 adheres to the developing devices 1*a* to 1*d*. Therefore, a priority is placed on controlling the intake fans 180*a* to 180*d* such that the temperatures of the developing devices 1*a* to 1*d* are a predetermined temperature.

Meanwhile, if the cover unit 125 is removed and maintenance is executed, the intake fans 180*a* to 180*d* may scatter the scattered toner deposited in the image forming units Pa to Pd. This is because volumes of air of the intake fans 180*a* to 180*d* are relatively large. Therefore, if the cover unit 125 is removed, the intake fans 180*a* to 180*d* are stopped.

Other Embodiments

The air taken in from the intake ports 175 with the operation of the intake fans 180*a* to 180*d* is sent to the developing devices 1*a* to 1*d* via the main body duct 174, the ducts 181*a* to 181*d*, and the relay ducts 228*a* to 228*d*, respectively. The developing devices 1*a* to 1*d* are thus appropriately cooled. However, this is only one example. For example, a group of components (e.g., the drum cleaning devices 4*a* to 4*d*) that constitute the image forming units Pa to Pd may be targets to be cooled by airflow. The control method described in FIG. 14B may be applied to the drum cleaning devices 4*a* to 4*d* in place of the developing devices 1*a* to 1*d* or in addition to the developing devices 1*a* to 1*d*.

The air taken in from the intake ports 175 with the operation of the intake fans 177*a* and 177*b* is supplied to the chargers 2*a* and 2*b* through the main body duct 174, the ducts 178*a* and 178*b*, and the relay ducts 225*a* and 225*b*, respectively. However, this is only one example. The above-described airflow and the control method described in FIG. 14A may be applied to other electrical components that generate ozone. Other electrical components that generate ozone include, for example, a post charger and a charge removing device.

Figure 16A:
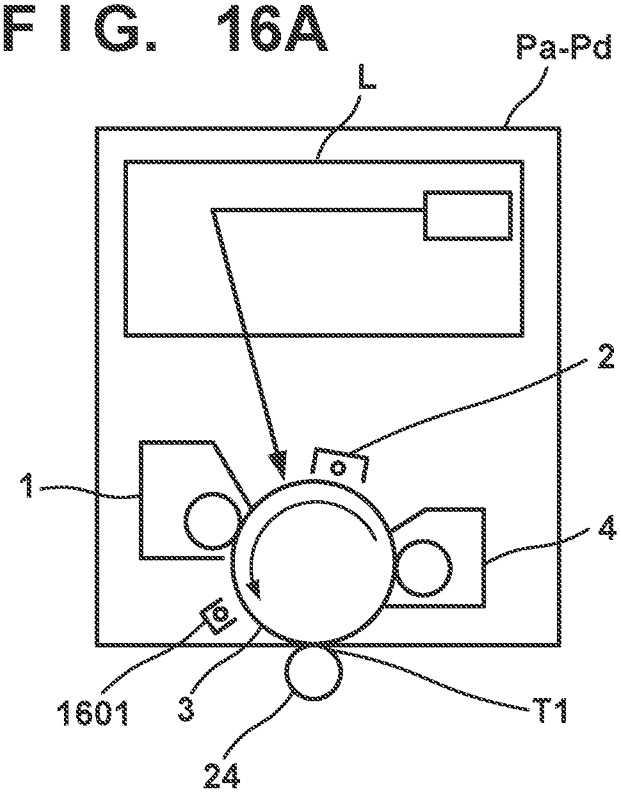
FIGS. 16A to 16C are diagrams illustrating variations.

As illustrated in FIG. 16A, a post charger 1601 is an electrical component that is disposed between the developing device 1 and the primary transfer unit T1 and improves toner image transfer performance. When the charge amounts of toner images formed by the developing devices 1*a* to 1*d* are different, it becomes difficult to overlay the toner images of different colors. Therefore, the post charger 1601 is disposed in each of the image forming units Pa to Pd so as to reduce a difference in the charge amounts of toners of different colors.

Figure 16B:
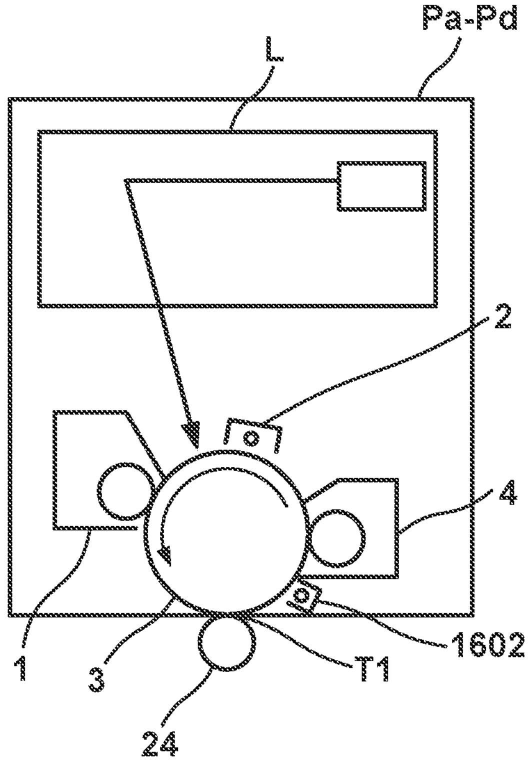
Figure 16C:
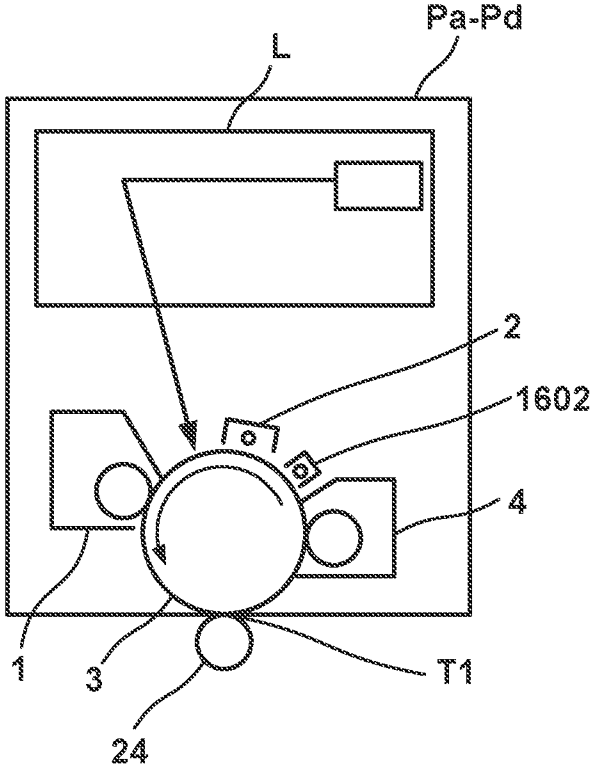

In FIG. 16B, a charge removing device 1602 is an electrical component that is disposed between the primary transfer unit T1 and the drum cleaning device 4 and improves the toner cleaning effectiveness of the drum cleaning device 4. As illustrated in FIG. 16C, the charge removing device 1602 may be disposed between the drum cleaning device 4 and the charger 2.

Figure 17:
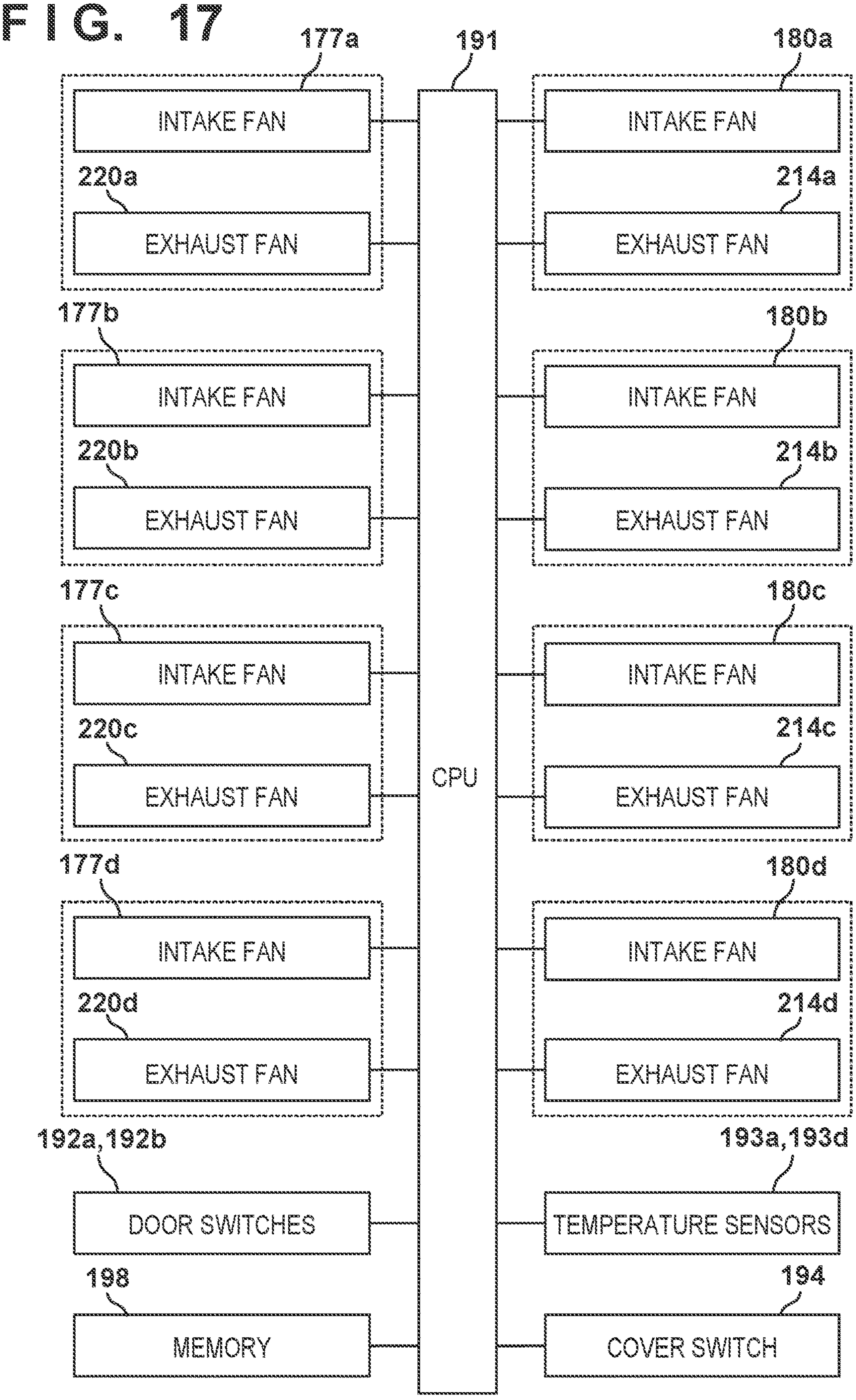
FIG. 17 is a diagram illustrating a variation.

Although the intake fans 177*a* and 177*b* are controlled in the above-described control method, as illustrated in FIG. 17, the exhaust fans 220*a* to 220*d* may also be controlled in conjunction with the intake fans 177*a* to 177*d*. In other words, the intake fan 177*a* and the exhaust fan 220*a* may be turned on/off by the CPU 191 in conjunction with each other. The intake fan 177*b* and the exhaust fan 220*b* may be turned on/off by the CPU 191 in conjunction with each other. Furthermore, the intake fan 177*c* and the exhaust fan 220*c* may be turned on/off by the CPU 191 in conjunction with each other. Furthermore, the intake fan 177*d* and the exhaust fan 220*d* may be turned on/off by the CPU 191 in conjunction with each other. The exhaust fans 220*c* and 220*d* are fans for discharging air that has passed through the chargers 2*c* and 2*d*.

Similarly, the exhaust fans 214*a* to 214*d* may be turned on/off in conjunction with the intake fans 180*a* to 180*d*. In other words, the intake fan 180*a* and the exhaust fan 214*a* may be turned on/off by the CPU 191 in conjunction with each other. The intake fan 180*b* and the exhaust fan 214*b* may be turned on/off by the CPU 191 in conjunction with each other. Furthermore, the intake fan 180*c* and the exhaust fan 214*c* may be turned on/off by the CPU 191 in conjunction with each other. Furthermore, the intake fan 180*d* and the exhaust fan 214*d* may be turned on/off by the CPU 191 in conjunction with each other.

Technical Concepts Derived from Embodiments

Item 1

The first housing 101*a* and the second housing 101*b* are examples of a housing. The image forming units Pa to Pd are examples of an image forming unit. The photosensitive drums 3*a* to 3*d* are examples of a photosensitive body. The chargers 2*a* to 2*d* are examples of a charger. The exposure devices La to Ld are examples of an exposure device. The developing devices 1*a* to 1*d* are examples of a developing device. The primary transfer rollers 24*a* to 24*d*, the intermediate transfer belt 130, and the outer roller 11 are examples of a transfer roller. The left front door 170*a*, the right front door 170*b*, and the cover 173 are examples of a protective member. The main body duct 174, the side ducts 174*a* and 174*b*, the ducts 181*a* to 181*d*, the ducts 178*a* and 178*b*, the exhaust duct 217*a*, and the like are examples of a duct. The intake fans 180*a* to 180*d*, the intake fans 177*a* and 177*b*, the exhaust fan 214*a*, and the exhaust fan 220*a* are an example of one or more fans. The CPU 191 is an example of at least one processor. As described above, when the protective member is in a protective state, rotation of the at least one fan is permitted, and when the protective member is in a non-protective state, rotation of the at least one fan is restricted, thereby preventing the inside of the image forming apparatus from being soiled by unfixed toner.

Item 2

The chargers 2*a* to 2*d*, the post charger 1601, and the charge removing device 1602 are examples of an electrical component that generates ozone. The main body duct 174, the ducts 178*a* and 178*b*, the relay ducts 225*a* and 225*b* are examples of a first supply duct. The main body duct 174, the ducts 181*a* to 181*d*, the relay ducts 228*a* to 228*d* are examples of a second supply duct. The intake fans 177*a* and 177*b* are examples of a first fan. The intake fans 180*a* to 180*d* are examples of a second fan. As described above, a fan for supplying air to an electrical component that causes an image defect due to toner entering may be stopped. Meanwhile, control of a fan for supplying air to an electrical component that does not easily cause an image defect due to toner entering may be permitted.

Item 3

The left front door 170*a* and the right front door 170*b* are examples of a first protective member. The cover 173 is an example of a second protective member. The door switches 192*a* and 192*b* are examples of a first circuit element. The cover switch 194 is an example of a second circuit element. When the door switches 192*a* and 192*b* are detecting that the doors are closed, rotation may be permitted for the first fan. When the door switches 192*a* and 192*b* are detecting that the doors are open, rotation may be restricted for the first fan. When the cover switch 194 is detecting the protective state, rotation of the second fan may be allowed. When the cover switch 194 is detecting the non-protective state, rotation of the second fan may be restricted. The second fan need not depend on states of the door switches 192*a* and 192*b* and may depend on the cover switch 194 and a temperature of the developing device.

Item 4

If the charger becomes soiled by unfixed toner, an image defect may occur.

Item 5

If a charge removing device becomes soiled by unfixed toner, an image defect may occur.

Item 6

If a post charger becomes soiled by unfixed toner, an image defect may occur.

Item 7

A group of other components different from the electrical component includes the developing device. This is because even if toner adheres to the developing device, an image defect does not easily occur.

Item 8

The drum cleaning devices 4*a* to 4*d* are examples of a cleaning member. A belt cleaning device for cleaning the intermediate transfer belt 130 is also an example of the cleaning member.

Item 9

The door switches 192*a* and 192*b* and the cover switch 194 are examples of a circuit element. Both the intake fan and the exhaust fan may be controlled by the CPU 191 in conjunction with each other. Alternatively, the intake fan may be omitted, and the exhaust fan may be disposed. In that case, the CPU 191 may control the exhaust fan in place of the intake fan.

Item 10

The left front door 170*a* and the right front door 170*b* are examples of a cover or a door that can be opened and closed.

Item 11

The cover 173 is an example of a cover or a door that can be attached and detached.

Item 12

The protruding portion 257 is an example of a protruding portion that protrudes in a direction of the normal of a first side surface (e.g., the front surface 251). The intake ports 175 are examples an intake port disposed on a lower surface of the protruding portion. When the intake ports 175 thus face downward, toner is easily sucked in. Therefore, when the left front door 170*a* is open, intake from the intake ports 175 is restricted.

Item 13

The conveyance unit 195 is an example of a conveyance roller. Since the intake ports 175 are positioned above the conveyance unit 195, when the conveyance unit 195 is pulled out, unfixed toner on a sheet easily enters the intake ports 175. Therefore, when the left front door 170*a* is open, intake from the intake ports 175 is restricted.

Item 14

As described above, the conveyance unit 195 may be configured to be capable of being pulled out from the front surface 251. This prevents unfixed toner from entering from the intake ports 175 while making it easy to take out a jammed sheet.

Item 15

The back surface 253 is an example of a second side surface.

Item 16

As described above, a fan stops or the rotation speed of the fan decreases, thereby preventing unfixed toner from being sucked in.

Item 17

The intake fans 177*a* to 177*d* and the intake fans 180*a* to 180*d*, which are permitted to rotate by the CPU 191, may be controlled according to a temperature of the image forming unit.

Item 18

The main body duct 174 and the like are examples of an intake duct. The primary exhaust duct 204*a* and the exhaust duct 217*a* are examples of a first exhaust duct. The exhaust duct 217*a* and the like are examples of a second exhaust duct. The exhaust fan 220*a* is an example of a third fan. The exhaust fan 214*a* is an example of a fourth fan. When the protective member is in the protective state, the CPU 191 may permit rotation of the first fan, the second fan, the third fan, and the fourth fan. When the protective member is in the non-protective state, the CPU 191 may restrict rotation of the first fan and the third fan and permit rotation of the second fan and the fourth fan. For example, a plurality of fans disposed in a duct associated with the charger may be controlled according to the state of the protective member. For example, a plurality of fans disposed in a duct associated with the developing device may be controlled independent of the state of the protective member.

Item 19

The first exhaust duct may include a first filter disposed between the charger and the third fan. The second exhaust duct includes a second filter disposed between the group of other components and the fourth fan.

Upon detecting a pull out of the conveyance roller, the CPU 191 may restrict rotation of the at least one fan. In that case, the door switches 192*a* and 192*b* may be replaced with a sensor for detecting a pull out of the conveyance roller.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-170873, filed Oct. 25, 2022 which is hereby incorporated by reference herein in its entirety.

What is claimed is:

1. An image forming apparatus comprising:
a housing; and
an image forming unit provided in the housing and configured to form an image on a sheet,
wherein the image forming unit includes:
a photosensitive body;
a charger configured to charge a surface of the photosensitive body;
an exposure device configured to form an electrostatic latent image by exposing the surface of the photosensitive body;
a developing device configured to form a toner image on the surface of the photosensitive body by developing the electrostatic latent image using toner; and
a transfer roller configured to transfer the toner image from the photosensitive body to a sheet, and
wherein the housing includes:
a protective member configured to be switched between in a protective state in which the protective member is protecting a protection target and in a non-protective state in which the protective member is not protecting the protection target;
an intake port configured to take in air;
a duct configured to guide the air taken in from the intake port to the image forming unit and guide the air from the image forming unit to outside of the housing;
an exhaust port connected to the duct and configured to discharge the air to outside of the housing;
a fan provided in a section from the intake port to the exhaust port in the duct and configured to assist intake, discharging or both of intake and discharging of the air; and
a processor configured to control the fan,
wherein the processor is configured to, in a case where the protective member is in the protective state, permit rotation of the fan and, in a case where the protective member is in the non-protective state, restrict rotation of the fan,
wherein the image forming unit further includes:
an electrical component that generates ozone;
a first supply duct configured to guide the air to the electrical component; and a second supply duct configured to guide the air to a group of other components different from the electrical component among a group of components constituting the image forming unit, wherein the fan includes:

a first fan disposed in the first supply duct; and a second fan disposed in the second supply duct, and wherein the processor is configured to:

in a case where the protective member is in the protective state, permit rotation of the first fan and the second fan, and in a case where the protective member is in the non-protective state, restrict rotation of the first fan and permit rotation of the second fan.

2. The image forming apparatus according to claim 1, wherein the electrical component that generates the ozone includes the charger.

3. The image forming apparatus according to claim 1, wherein the electrical component that generates the ozone includes a charge removing device disposed between the transfer roller and the charger in a direction of rotation of the photosensitive body and configured to remove charge of the photosensitive body.

4. The image forming apparatus according to claim 1, wherein the electrical component that generates the ozone includes a post charger disposed between the developing device and the transfer roller and configured to perform post charging on the photosensitive body.

5. The image forming apparatus according to claim 1, wherein the group of other components different from the electrical component includes the developing device.

6. The image forming apparatus according to claim 1, wherein the group of other components different from the electrical component includes a cleaning member disposed between the transfer roller and the charger in a direction of rotation of the photosensitive body and configured to clean the photosensitive body.

7. The image forming apparatus according to claim 1, further comprising:

a circuit element configured to detect whether the protective member is in the protective state or the protective member is in the non-protective state, the processor controls the fan based on a detection result of the circuit element.

8. The image forming apparatus according to claim 1, wherein the protective member includes a cover or a door provided on the housing and configured to be capable of being opened and closed.

9. The image forming apparatus according to claim 1, wherein the protective member includes a cover or a door provided on the housing and configured to be capable of being attached and detached.

10. The image forming apparatus according to claim 1, wherein the protective member is provided so as to cover at least a portion of a first side surface of a plurality of side surfaces defining the housing, wherein the first side surface includes a protruding portion protruding in a direction of a normal of the first side surface, and wherein the intake port is disposed on a lower surface of the protruding portion.

11. The image forming apparatus according to claim 10, further comprising:

a conveyance roller configured to convey the sheet in the housing, wherein a height from a bottom surface of the housing to the intake port is greater than a height from the bottom surface of the housing to the conveyance roller.

12. The image forming apparatus according to claim 11, wherein in a case where the protective member is in the non-protective state, the conveyance roller is configured to be capable of being pulled out from the first side surface.

13. The image forming apparatus according to claim 10, wherein the exhaust port is disposed on a second side surface not adjacent to the first side surface among the plurality of side surfaces defining the housing.

14. The image forming apparatus according to claim 1, wherein restricting rotation of the fan includes:

stopping the fan; or lowering a rotation speed of the fan to less than a prescribed rotation speed.

15. The image forming apparatus according to claim 1, further comprising:

a temperature sensor configured to measure a temperature of the image forming unit, wherein in a case where rotation of the fan is permitted, the processor controls the rotation speed of the fan according to the temperature measured by the temperature sensor.

16. The image forming apparatus according to claim 1, wherein the duct includes:

an intake duct configured to guide the air from the intake port to the first fan and the second fan;

a first exhaust duct configured to guide the air from the charger; and a second exhaust duct configured to guide the air from the group of other components different from the charger, wherein the fan includes:

a third fan provided for the first exhaust duct; and a fourth fan provided for the second exhaust duct, and wherein the processor is configured to:

in a case where the protective member in the protective state, permit rotation of the first fan, the second fan, the third fan, and the fourth fan, and in a case where the protective member is in the non-protective state, restrict rotation of the first fan and the third fan and permit rotation of the second fan and the fourth fan.

17. The image forming apparatus according to claim 16, wherein the first exhaust duct includes a first filter disposed between the charger and the third fan, and wherein the second exhaust duct includes a second filter disposed between the group of other components and the fourth fan.

18. An image forming apparatus comprising:

a housing; and an image forming unit provided in the housing and configured to form an image on a sheet, wherein the image forming unit includes:

a photosensitive body:

a charger configured to charge a surface of the photosensitive body;

an exposure device configured to form an electrostatic latent image by exposing the surface of the photosensitive body:

a developing device configured to form a toner image on the surface of the photosensitive body by developing the electrostatic latent image using toner; and a transfer roller configured to transfer the toner image from the photosensitive body to a sheet, and wherein the housing includes:

a protective member configured to be switched between in a protective state in which the protective member is protecting a protection target and in a non-protective state in which the protective member is not protecting the protection target;

an intake port configured to take in air;

a duct configured to guide the air taken in from the intake port to the image forming unit and guide the air from the image forming unit to outside of the housing;

an exhaust port connected to the duct and configured to discharge the air to outside of the housing;

a fan provided in a section from the intake port to the exhaust port in the duct and configured to assist intake, discharging or both of intake and discharging of the air; and a processor configured to control the fan, wherein the processor is configured to, in a case where the protective member is in the protective state, permit rotation of the fan and, in a case where the protective member is in the non-protective state, restrict rotation of the fan, wherein the image forming unit further includes:

an electrical component that generates ozone;

a first supply duct configured to guide the air to the electrical component; and a second supply duct configured to guide the air to a group of other components different from the electrical component among a group of components constituting the image forming unit, wherein the fan includes:

a first fan disposed in the first supply duct; and a second fan disposed in the second supply duct, wherein the protective member includes:

a first protective member; and a second protective member disposed between the housing and the first protective member, wherein the image forming apparatus further includes:

a first circuit element configured to detect a state of the first protective member; and a second circuit element configured to detect a state of the second protective member; and wherein the processor, in a case where the first circuit element is detecting the protective state of the first protective member, permits rotation of the first fan, in a case where the first circuit element is detecting the non-protective state of the first protective member, restricts rotation of the first fan, in a case where the second circuit element is detecting the protective state of the second protective member, permits rotation of the second fan, and in a case where the second circuit element is detecting the non-protective state of the second protective member, restricts rotation of the second fan.

19. An image forming apparatus comprising:

a housing;

a conveyance roller provided in the housing and configured to convey a sheet and be pulled out when the sheet becomes jammed; and an image forming unit provided in the housing and configured to form an image on the sheet, wherein the image forming unit includes:

a photosensitive body;

a charger configured to charge a surface of the photosensitive body;

an exposure device configured to form an electrostatic latent image by exposing the surface of the photosensitive body;

a developing device configured to form a toner image on the surface of the photosensitive body by developing the electrostatic latent image using toner; and a transfer roller configured to transfer the toner image from the photosensitive body to a sheet, and wherein the housing includes:

a protective member configured to be switched between in a protective state in which the protective member is protecting a protection target and in a non-protective state in which the protective member is not protecting the protection target;

an intake port configured to take in air and such that, when the conveyance roller is pulled out, the conveyance roller is positioned below the intake port;

a duct configured to guide the air taken in from the intake port to the image forming unit and guide the air from the image forming unit to outside of the housing;

an exhaust port connected to the duct and configured to discharge the air to outside of the housing;

a fan provided in a section from the intake port to the exhaust port in the duct and configured to assist intake, discharging or both of intake and discharging of the air; and a processor configured to control the fan, wherein the processor is configured to, in a case where the protective member is in the protective state, permit rotation of the fan and, in a case where the protective member is in the non-protective state, restrict rotation of the fan, wherein the image forming unit further includes:

an electrical component that generates ozone;

a first supply duct configured to guide the air to the electrical component; and a second supply duct configured to guide the air to a group of other components different from the electrical component among a group of components constituting the image forming unit, wherein the fan includes:

a first fan disposed in the first supply duct; and a second fan disposed in the second supply duct, and wherein the processor is configured to:

in a case where the protective member is in the protective state, permit rotation of the first fan and the second fan, and in a case where the protective member is in the non-protective state, restrict rotation of the first fan and permit rotation of the second fan.

* * * * *